United States Patent
Kaneko

(10) Patent No.: US 10,077,732 B2
(45) Date of Patent: Sep. 18, 2018

(54) FUEL INJECTION CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Naoya Kaneko, Gotenba (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 25 days.

(21) Appl. No.: 15/128,209

(22) PCT Filed: Mar. 4, 2015

(86) PCT No.: PCT/IB2015/000271
§ 371 (c)(1),
(2) Date: Sep. 22, 2016

(87) PCT Pub. No.: WO2015/145228
PCT Pub. Date: Oct. 1, 2015

(65) Prior Publication Data
US 2017/0096959 A1    Apr. 6, 2017

(30) Foreign Application Priority Data
Mar. 25, 2014 (JP) .................. 2014-061902

(51) Int. Cl.
*F02D 41/24*    (2006.01)
(52) U.S. Cl.
CPC ................. *F02D 41/2467* (2013.01)
(58) Field of Classification Search
CPC ...... F02D 41/24; F02D 41/2467; F02D 41/26; F02D 41/30; F02D 41/345; F02D 41/38; F02D 41/40; Y02T 10/44
USPC ............... 123/295, 299, 300, 305, 445, 480; 701/103, 104
See application file for complete search history.

(56) References Cited

U.S. PATENT DOCUMENTS

| 5,038,737 A | * | 8/1991 | Nishiyama | ............ F02D 35/023 123/406.42 |
| 5,093,793 A | * | 3/1992 | Suzuki | .................. F02D 41/266 700/2 |
| 6,360,531 B1 | * | 3/2002 | Wiemero | .................. F01L 1/34 123/299 |

(Continued)

FOREIGN PATENT DOCUMENTS

| DE | 10 2007 000 063 A1 | 8/2007 |
| JP | 5-125985 | 5/1993 |

(Continued)

OTHER PUBLICATIONS

JP 2007-205247 A English Translation Version.*

*Primary Examiner* — John Kwon
*Assistant Examiner* — Johnny H Hoang
(74) *Attorney, Agent, or Firm* — Finnegan, Henderson, Farabow, Garrett & Dunner, LLP

(57) ABSTRACT

When single-injection control is executed, processing for initiating full injection is executed at a crank angle immediately before initiation of each fuel injection among crank angles at crank angle intervals of 30°. When multi-injection control is executed, processing for initiating the fuel injection is executed at a crank angle immediately before the initiation of the each fuel injection among crank angles at crank angle intervals of 10°.

12 Claims, 22 Drawing Sheets

(56) References Cited

U.S. PATENT DOCUMENTS

| | | | | |
|---|---|---|---|---|
| 2001/0037797 | A1* | 11/2001 | Arai | F01L 9/04 |
| | | | | 123/480 |
| 2002/0195081 | A1* | 12/2002 | McGee | F02D 41/045 |
| | | | | 123/299 |
| 2003/0106521 | A1* | 6/2003 | Konrad | F02P 5/1504 |
| | | | | 123/295 |
| 2013/0055980 | A1* | 3/2013 | Yokoyama | F01L 1/2405 |
| | | | | 123/90.17 |
| 2013/0206108 | A1* | 8/2013 | Schule | F02D 13/0226 |
| | | | | 123/435 |
| 2016/0169133 | A1* | 6/2016 | Yeager | F02D 41/0027 |
| | | | | 123/435 |

FOREIGN PATENT DOCUMENTS

| | | | | |
|---|---|---|---|---|
| JP | 2001-59441 | | 3/2001 | |
| JP | 2007205247 A | * | 8/2007 | ......... F02D 41/3845 |
| JP | 2015-218614 | | 12/2015 | |
| WO | WO 2015/173622 A1 | | 11/2015 | |

* cited by examiner

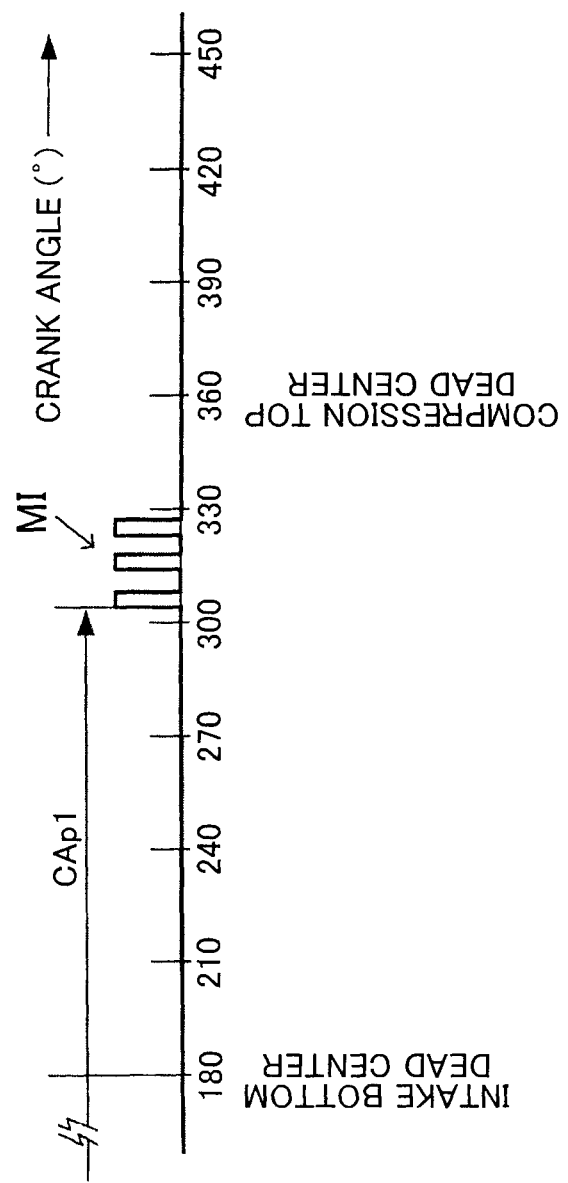

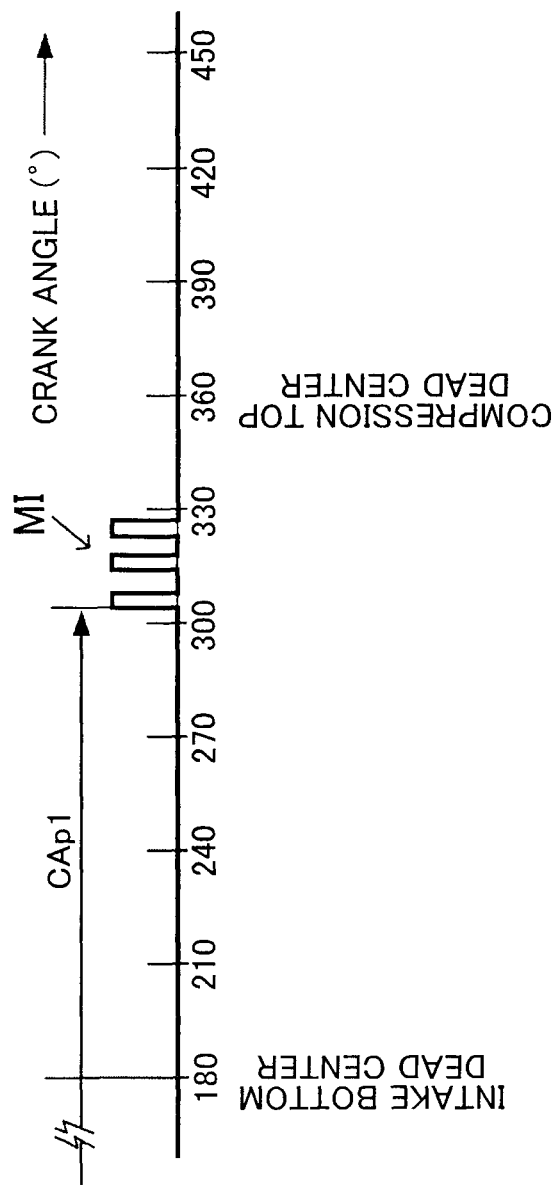

FUEL INJECTION CONTROL DEVICE FOR INTERNAL COMBUSTION ENGINE

CROSS-REFERENCE TO RELATED APPLICATIONS

This application is a national phase application of International Application No. PCT/IB2015/000271, filed Mar. 4, 2015, and claims the priority of Japanese Application No. 2014-061902, filed Mar. 25, 2014, the content of both of which is incorporated herein by reference.

BACKGROUND OF THE INVENTION

1. Field of the Invention

The present invention relates to a fuel injection control device for an internal combustion engine.

2. Description of Related Art

Japanese Patent Application Publication No. 2001-59441 (JP 2001-59441 A) discloses a fuel injection control device for an internal combustion engine (hereinafter a "conventional device"). This conventional device computes a fuel injection amount for realizing a target air-fuel ratio (hereinafter a "target injection amount") by using an engine speed (a parameter value) that influences an intake air amount.

More specifically, when the engine speed is relatively low, a long time is required for a crank angle to be advanced by a predetermined angle. Thus, the engine speed may change significantly while the crank angle is advanced by the predetermined angle. When the engine speed changes significantly, just as described, this change has a significant influence on the intake air amount. Accordingly, in the case where the engine speed is sampled at relatively long intervals (for example, crank angle intervals of) 180° when the engine speed is relatively low, the significant change of the engine speed may not be reflected to the computation of the target injection amount. Consequently, the target air-fuel ratio may not be realized.

For this reason, in the conventional device, the engine speed is sampled at crank angle intervals of 10° when the engine speed is equal to a predetermined speed or lower.

On the other hand, when the engine speed is relatively high, a short time is required for the crank angle to be advanced by 180°. Thus, the engine speed hardly changes while the crank angle is advanced by 180°. Even when the engine speed changes, this change hardly influences the intake air amount. Accordingly, in the case where the engine speed is sampled at relatively short intervals (for example, crank angle intervals of 10°) when the engine speed is relatively high, the change of the engine speed that hardly influences the intake air amount may be reflected to the computation of the target injection amount. Consequently, the target air-fuel ratio may not be realized.

For this reason, in the conventional device, the engine speed is sampled at crank angle intervals of 180° when the engine speed is higher than the predetermined speed.

Just as described, in the conventional device, the intervals at which the engine speed is sampled are switched in accordance with the engine speed. Meanwhile, in the conventional device, a computation interval of the target injection amount is a constant interval (4 ms) regardless of the engine speed.

By the way, when multi-injection control, in which fuel is continuously injected for plural times within a short time period, is executed, parameter values (for example, the engine speed, an engine load, fuel pressure, and in-cylinder pressure) that are used to compute control values on fuel injection (for example, initiation timing of fuel injection and a fuel injection time period) may be changed due to an influence of the each fuel injection or the like during execution of plural times of the fuel injection. Accordingly, in order to realize the appropriate fuel injection in the each fuel injection, the control values are preferably calculated at timing that is the closest to initiation timing of the each fuel injection as possible, so that changes of the parameter values are reflected to the computation of the control values. However, in the conventional device, the computation intervals of the target injection amount, which is one of the control values, are constant. Thus, when each, of the computation intervals is set as a long interval, the changes of the parameter values may not be reflected to the computation of the control values on the each fuel injection. Therefore, the appropriate fuel injection may not be realized.

Furthermore, in the case where single-injection control, in which the fuel is injected only once within the short time period, is executed, even when the parameter values are changed due to the influence of the fuel injection or the like, there is no fuel injection to which these changes should immediately be reflected. Thus, even when the computation interval of the control value is longer than that in the multi-injection control, the appropriate fuel injection is sufficiently realized. In addition, if the computation interval of the control value is reduced even in such a case, a processing load on the computation is excessively increased. Thus, such shortening is not preferred. Meanwhile, as described above, the computation intervals of the target injection amount are constant in the conventional device. Accordingly, when each of these computation intervals is set as a short interval, the processing load on the computation may excessively be increased.

SUMMARY OF THE INVENTION

The present invention provides a fuel injection control device that executes: single-injection control in which fuel is injected only once within a short time period; and multi-injection control in which fuel is injected for plural times within the short time period, and that prevents an excess increase of a processing load for realizing each time of fuel injection, so as to realize the appropriate fuel injection.

The present invention relates to a fuel injection control device that is applied to an internal combustion engine including a fuel injection valve. The fuel injection control device has a control section (an electronic control unit) that: samples parameter values on an operation state of the engine (for example, an engine speed, an engine load, fuel pressure, and in-cylinder pressure) at predetermined sampling intervals; repeatedly computes control values on fuel injection from the fuel injection valve (for example, an injection crank angle, a fuel injection time period, and a required time period from a current time point to the initiation of fuel injection) at predetermined intervals on the basis of the latest values among the sampled parameter values; and controls the fuel injection on the basis of the computed control values.

The predetermined interval includes, for example, a constant time period, an arbitrary time period, a constant crank angle, and an arbitrary crank angle. When the predetermined interval is the arbitrary time period, for example, the control value is computed at a time point when the control section can compute the control value. Furthermore, when the predetermined interval is the arbitrary crank angle, for example, the control value is computed at a crank angle at which the control section can compute the control value.

The control section is configured to execute processing for initiating the each fuel injection in either one of a first processing mode and a second processing mode. In the first computing mode, the processing for initiating the each fuel injection is executed on the basis of the latest usable control value at a crank angle immediately before the initiation of the each fuel injection among crank angles at first crank angle intervals (for example, crank angle intervals of 30°). In the second processing mode, processing for initiating the each fuel injection is executed on the basis of the latest usable control value at a crank angle immediately before the initiation of the each fuel injection among crank angles at second crank angle intervals (for example, crank angle intervals of 10°), the second crank angle interval being shorter than the first crank angle interval.

Furthermore, the control section is configured to execute processing for initiating the fuel injection of single-injection control in the first processing mode when executing the single-injection control in which the fuel injection is initiated only once within a time period corresponding to the first crank angle interval.

Meanwhile, the control section is configured to execute processing for initiating the each fuel injection of multi-injection control in the second processing mode when executing the multi-injection control in which the fuel injection is initiated plural times within the time period corresponding to the first crank angle interval.

According to the present invention, when the multi-injection control is executed, the processing for initiating the each fuel injection of the multi-injection control (hereinafter, processing for initiating the fuel injection is also referred to as "injection initiation processing") is executed at the crank angle immediately before the each fuel injection among the crank angles at the second crank angle intervals, the second crank angle interval being shorter than the first crank angle interval. The injection initiation processing at least includes "setting of initiation time of the each fuel injection" and/or "determination of a fuel injection time period of the each fuel injection". Accordingly, the injection initiation processing is executed on the basis of the control value that is computed at a time point that is the closest to a time point at which the each fuel injection of the multi-injection control is initiated. For this reason, even when the parameter value is changed due to an influence of the each fuel injection or the like during execution of plural times of the fuel injection of the multi-injection control, the injection initiation processing is highly likely to be executed on the basis of the control value, to which this change is reflected. As a result, the change is highly likely to be reflected to the each fuel injection. Therefore, the further appropriate fuel injection is realized in the multi-injection control.

Noted that, regarding the parameter values of the present invention, the latest value is, for example, the latest parameter value that can be used to compute the control value on the each fuel injection among the parameter values that are acquired by AD conversion (for example, the engine load, the fuel pressure, and the in-cylinder pressure). Alternatively, the latest value is, for example, the latest parameter value that can be used to compute the control value on the each fuel injection among the parameter values that are acquired by computation (for example, the engine speed).

Furthermore, in the case where the internal combustion engine is a multi-cylinder internal combustion engine and where both of the single-injection control and the multi-injection control are executed in one engine cycle of each cylinder, the multi-injection control may be executed in another cylinder immediately after the single-injection control is executed in one cylinder. Alternatively, the single-injection control may be executed in another cylinder immediately after the multi-injection control is executed in one cylinder. In other words, the single-injection control and the multi-injection control may alternately be executed at extremely short time intervals. In this case, if the control section executes the injection initiation processing for the fuel injection of the single-injection control in the first processing mode and executes the injection initiation processing for the each fuel injection of the multi-injection control in the second processing mode, the control section needs to execute the injection initiation processing while frequently switching the processing modes. This causes an excess increase of a processing load on the injection initiation processing and causes excess complication of a processing program on the injection initiation processing.

In view of the above, it is preferred that the internal combustion engine is the multi-cylinder internal combustion engine, and that the control section is configured to execute processing for initiating the each fuel injection (the injection initiation processing) of the single-injection control and the multi-injection control in the second processing mode when the single-injection control and the multi-injection control are executed in one engine cycle of the each cylinder.

Furthermore, the control section may be configured to compute the control value in either one of a first computing mode and a second computing mode. In the first computing mode, the control value is computed at least at the crank angle immediately before the initiation of the each fuel injection among the crank angles at the first crank angle intervals. In the second computing mode, the control value is computed at least at the crank angle immediately before the initiation of the each fuel injection among the crank angles at the second crank angle intervals. In this case, it is preferred that the control section is configured to compute the control value in the first computing mode when executing the single-injection control and to compute the control value in the second computing mode when executing the multi-injection control.

According to the above, when the multi-injection control is executed, the control value that is computed at the time point that is the closest to a time point at which the each fuel injection of the multi-injection control is initiated is used in the injection initiation processing. For this reason, even when the parameter value is changed due to an influence of the each fuel injection or the like during the execution of plural times of the fuel injection of the multi-injection control, the change is highly likely to be reflected to the control value that is used in the injection initiation processing. As a result, the change is highly likely to be reflected to the each fuel injection. Therefore, the further appropriate fuel injection is realized in the multi-injection control.

In this case, in the first computing mode, the control section may compute the control value only at the crank angle immediately before the initiation of the each fuel injection among the crank angles at the first crank angle intervals.

Furthermore, for example, when "the injection crank angle, the fuel injection time period, and the required time period from the current time point to the initiation of fuel injection" are computed as "the control values", at least one of these control values is computed at the crank angle immediately before the each fuel injection.

Furthermore, the control section may be configured to compute the control value in either one of the first computing mode and the second computing mode. In the first computing mode, the control value is computed at the first crank angle intervals. In the second computing mode, the control value is computed at the second crank angle intervals. In this case, it is preferred that the control section is configured to compute the control value in the first computing mode when executing the single-injection control and to compute the control value in the second computing mode when executing the multi-injection control.

According to this, when the multi-injection control is executed, the control value is computed at the second crank angle interval that is shorter than the first crank angle interval. Thus, the control, value that is computed at the time point that is the closest to the time point at which the each fuel injection of the multi-injection control is initiated is used in the injection initiation processing. For this reason, even when the parameter value is changed due to the influence of the each fuel injection or the like during the execution of plural times of the fuel injection of the multi-injection control, the change is highly likely to be reflected to the control value that is used in the injection initiation processing. As a result, the change is highly likely to be reflected to the each fuel injection. Therefore, the further appropriate fuel injection is realized in the multi-injection control.

Furthermore, according to this, when the single-injection control is executed, the control value is computed at the first crank angle intervals, the first crank angle interval being longer than the second crank angle interval. As described above, in the case where the single-injection control is executed, even when the parameter value is changed due to the influence of the fuel injection or the like, there is no fuel injection to which this change should immediately be reflected. Thus, even when a computation interval of the control value is longer than that of a case where the multi-injection control is executed, the appropriate fuel injection is sufficiently realized. In addition, it is not preferred to reduce the computation interval of the control value even in such a case since the reduction causes an excess increase of a processing load on the computation of the control value. Accordingly, in the single-injection control, the control value is computed at the first crank angle intervals, the first crank angle interval being longer than the second crank angle interval. Therefore, the excess increase of the processing load on the computation of the control value is prevented.

In this case, for example, when "the injection crank angle, the fuel injection time period, and the required time period from the current time point to the time point at which the fuel injection is initiated" are computed as "the control values", at least one of these control values is computed at the first crank angle intervals or the second crank angle intervals.

Furthermore, in the case where the internal combustion engine is the multi-cylinder internal combustion engine and where both of the single-injection control and the multi-injection control are executed in one engine cycle of the each cylinder, as described above, the single-injection control and the multi-injection control may alternately be executed at the extremely short time intervals. In this case, if the control section computes the control value in the first computing mode and executes the injection initiation processing in the first processing mode for the single-injection control, and if the control section computes the control value in the second computing mode and executes the injection initiation processing in the second processing mode for the multi-injection control, the control section needs to execute the computation of the control value and the injection initiation processing while frequently switching the computing modes and the processing modes. This causes the excess increase of the processing load on the computation of the control value and the injection initiation processing and the excess complication of the processing program on the computation and the injection initiation processing.

In view of the above, in the case where the internal combustion engine is, the multi-cylinder internal combustion engine and where both of the single-injection control and the multi-injection control are executed in one engine cycle of the each cylinder, it is preferred that the control section is configured to compute the control value in the second computing mode and execute the processing for initiating the each fuel injection of the single-injection control and the multi-injection control in the second processing mode.

Furthermore, the control section may be configured to sample the parameter value in either one of a first sampling mode and a second sampling mode. In the first sampling mode, the parameter value is sampled at first sampling intervals. In the second sampling mode, the parameter value is sampled at second sampling intervals, the second sampling interval being shorter than the first sampling interval. In this case, it is preferred that the control section is configured to sample the parameter value in the first sampling mode when executing the single-injection control, and that the control section is configured to sample the parameter value in the second sampling mode when executing the multi-injection control.

According to this, when the multi-injection control is executed, the parameter value is sampled at the second sampling intervals, the second sampling interval being shorter than the first sampling interval. Accordingly, the parameter value that is sampled at the time point that is the closest to a time point at which the control value used in the injection initiation processing is computed is used to compute the control value. For this reason, even when the parameter value is changed due to the influence of the each fuel injection or the like during the execution of plural times of the multi-injection control, the change is highly likely to be reflected to the control value that is used in the injection initiation processing. As a result, the change is highly likely to be reflected to the each fuel injection. Therefore, the further appropriate fuel injection is realized in the multi-injection control.

Furthermore, according to this, when the single-injection control is executed, the parameter value is sampled at the first sampling intervals, the first sampling interval being longer than the second sampling interval. As described above, in the case where the single-injection control is executed, even when the parameter value is changed due to the influence of the fuel injection or the like, there is no fuel injection to which this change should immediately be reflected. Thus, even when the sampling interval of the parameter value is longer than that of a case where the multi-injection control is executed, the appropriate fuel injection is sufficiently realized. In addition, it is not preferred to reduce the sampling interval of the parameter value even in such a case since the reduction causes the excess increase of the processing load on the sampling of the parameter values. Accordingly, when the single-injection control is executed, the parameter value is sampled at the first sampling intervals, the first sampling, interval being longer than the second sampling interval. Therefore, the excess increase of the processing load on sampling of the parameter value is prevented.

Furthermore, the first sampling interval is, for example, a constant first time interval. The second sampling interval is, for example, a constant second time interval that is shorter than the first time interval.

Alternatively, the first sampling interval is, for example, the first crank angle interval. The second sampling interval is, for example, the second crank angle interval. In this case, for example, the control section is configured to sample the engine speed that is one of the parameter values in the first sampling mode when executing the single-injection control, and to sample the engine speed in the second sampling mode when executing the multi-injection control. According to this, a change of the engine speed can further reliably be reflected to the control value that is used in the injection initiation processing.

Furthermore, in the case where the internal combustion engine is the multi-cylinder internal combustion engine, and where both of the single-injection control and the multi-injection control are executed in one engine cycle of the each cylinder, as described above, the single-injection control and the multi-injection control may alternately be executed at the extremely short time intervals. In this case, if the control section samples the parameter value at the first sampling intervals, computes the control value at the first computing intervals, and executes the injection initiation processing in the first processing mode for the single-injection control, and if the control section samples the parameter value at the second sampling intervals, computes the control value at the second computing intervals, and executes the injection initiation processing in the second processing mode for the multi-injection control, the control section needs to execute the sampling of the parameter values, the computation of the control value, and the injection initiation processing while frequently switching the modes. This may cause the excess increase of the processing load on such sampling of the parameter value, computation of the control value, and injection initiation processing and the excess complication of the processing program on such sampling of the parameter value, computation of the control value, and injection initiation, processing.

In view of the above, in the case where the internal combustion engine is the multi-cylinder internal combustion engine and where both of the single-injection control and the multi-injection control are executed in one engine cycle in the each cylinder, it is preferred that the control section is configured to sample the parameter value in the second sampling mode, compute the control value in the second computing mode, and execute the processing for initiating the each fuel injection of the single-injection control and the multi-injection control in the second processing mode.

Furthermore, the each fuel injection of the multi-injection control may be, for example, partial injection in which a needle valve is closed before a needle lift amount of the fuel injection valve reaches a maximum lift amount.

Furthermore, the fuel injection of the single-injection control may be, for example, full injection in which the needle valve is closed after the needle lift amount of the fuel injection valve reaches the maximum lift amount.

The other objects, the other characteristics, and accompanying advantages of the present invention shall easily be understood from the description of each embodiment of the present invention, which will be described with reference to the following drawings.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6A is a time chart that indicates the energization to the fuel injection valve in the case where multi-injection control is executed.

FIG. 7A is the same chart as FIG. 6A, FIG. 7B shows a case where the predetermined crank angle interval is a crank angle interval of 10°;

DETAILED DESCRIPTION OF EMBODIMENTS

Figure 1:
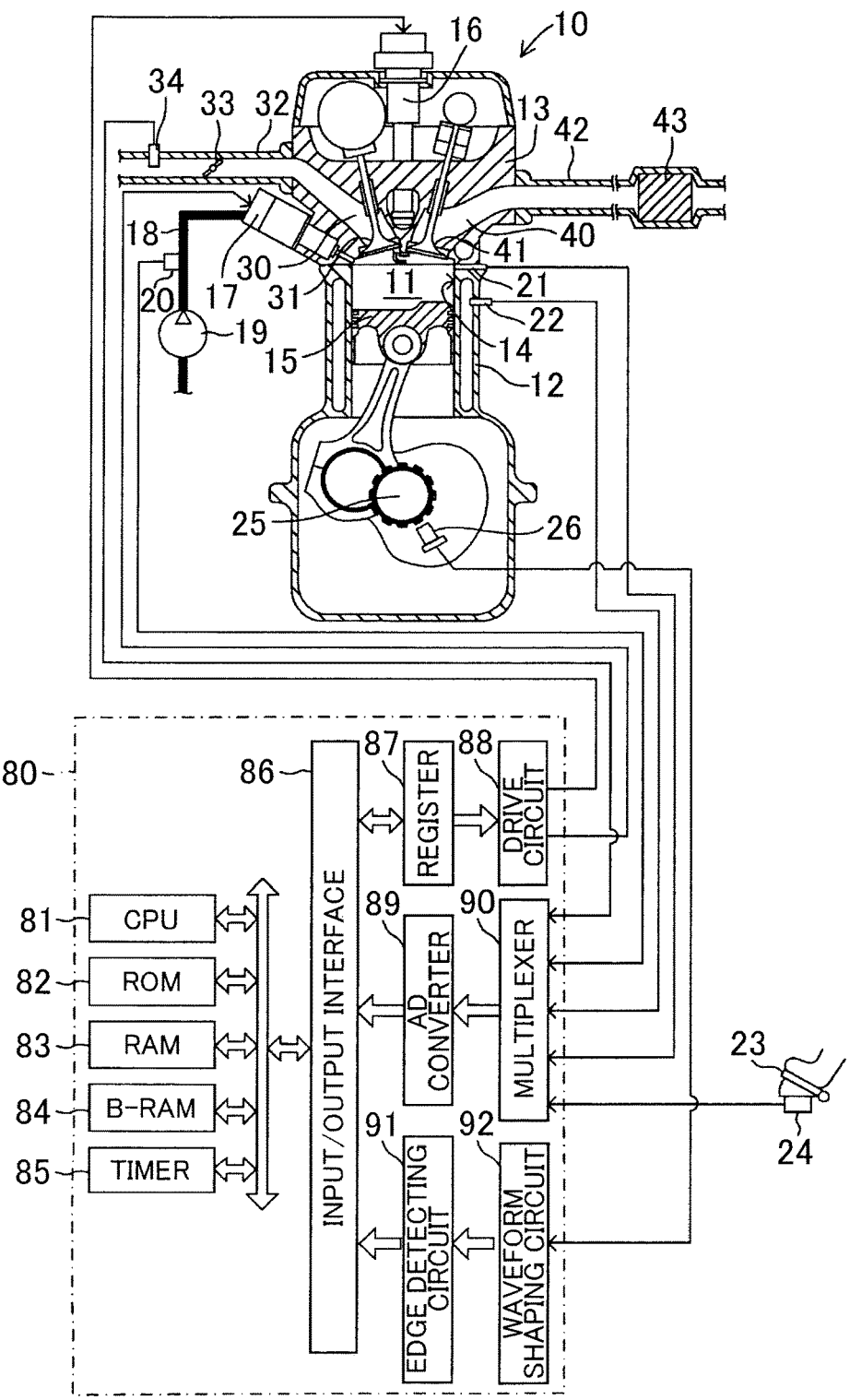
FIG. 1 is a vertical sectional view of an internal combustion engine to which a fuel injection control device according to a first embodiment of the present invention is applied.

A description will hereinafter be made on a fuel injection control device according to embodiments of the present invention with reference to the drawings. As shown in FIG. 1, an internal combustion engine 10 is a four-cycle gasoline engine of spark ignition and cylinder fuel injection type.

The engine 10 has a cylinder block 12 and a cylinder head 13. The cylinder block 12 is formed with a cylinder bore 14. A piston 15 is fitted in the cylinder bore 14. A combustion chamber 11 is defined by a wall surface of the cylinder head 13, an inner peripheral wall surface of the cylinder bore 14, and a crown surface of the piston 15. Although not shown, the engine 10 has the four combustion chambers (cylinders) 11. The cylinder head 13 is formed with an intake port 30 and an exhaust port 40, each of which communicates with the combustion chamber 11. Furthermore, an intake valve 31 and an exhaust valve 41 are disposed in the cylinder head 13. The intake valve 31 opens or closes an end opening of the intake port 30 on the combustion chamber 11 side, and the exhaust valve 41 opens or closes an end opening of the exhaust port 40 on the combustion chamber 11 side.

The engine 10 has an intake pipe 32. The intake pipe 32 is connected to the cylinder head 13 such that an internal passage thereof communicates with the intake port 30. A throttle valve 33 is arranged in the internal passage of the intake pipe 32. Furthermore, the engine 10 has an exhaust pipe 42. The exhaust pipe 42 is connected to the cylinder head 13 such that an internal passage thereof communicates with the exhaust port 40. An exhaust gas control catalyst 43 that purifies components of the exhaust gas is arranged in the internal passage of the exhaust pipe 42. The exhaust gas control catalyst 43 exerts its function of purifying the components of the exhaust gas when a temperature thereof (hereinafter, a "catalyst temperature") is at least equal to an activation temperature.

In the cylinder head 13, one ignition system 16 and one fuel injection valve 17 are disposed for the each combustion chamber 11. The ignition system 16 includes an igniter, an ignition coil, and a spark plug. The injection valve 17 is disposed in the cylinder head 13 so as to directly inject fuel into the cylinder (that is, into the combustion chamber 11).

A fuel pump 19 is connected to the injection valve 17 via a fuel supply pipe 18. The fuel pump 19 is driven by a cam (not shown) that rotates in conjunction with rotation of the engine 10. The fuel pump 19 increases pressure of the fuel that is supplied from a fuel tank (not shown) by a low-pressure fuel pump (not shown), and supplies the high-pressure fuel, the pressure of which is increased, to the injection valve 17 via the fuel supply pipe 18.

The fuel pump 19 includes an electromagnetic valve (not shown) in a fuel suction section thereof. On the basis of an instruction from an ECU 80, the electromagnetic valve is opened when a sucking operation of the fuel pump 19 is initiated, and is closed at predetermined timing during a pressurizing operation. As the timing at which this electromagnetic valve is closed is accelerated, an effective stroke of a plunger (not shown) of the fuel pump 19 is extended. Thus, an amount of the fuel that is discharged from the fuel pump 19 is increased. As a result, the pressure of the fuel that is supplied to the injection valve 17 is increased.

A fuel pressure sensor 20 for detecting fuel pressure (that is, pressure of the fuel in the fuel supply pipe 18) is disposed in the fuel supply pipe 18. An airflow meter (intake air amount sensor) 34 for detecting a flow rate of the air flowing through the internal passage of the intake pipe 32 is disposed on an upstream of the throttle valve 33 in the intake pipe 32. An in-cylinder pressure sensor 21 for detecting in-cylinder pressure (that is, pressure in the combustion chamber 11) is disposed in the cylinder block 12. The one in-cylinder pressure sensor 21 may be provided for the each combustion chamber 11, or may only be provided in any one of the combustion chambers 11. Furthermore, a coolant temperature sensor 22 for detecting a temperature of a coolant for cooling the engine 10 is disposed in the cylinder block 12. An accelerator pedal depression amount sensor 24 for detecting a depression amount of an accelerator pedal 23 is attached to the accelerator pedal 23. Furthermore, a crank angle sensor 26 is disposed in the vicinity of a crankshaft 25 in the engine 10.

The ECU 80 is an electronic control circuit (electronic control unit) that includes a well-known microcomputer. The microcomputer includes a CPU 81, a ROM 82, a RAM (memory) 83, a backup RAM 84, a timer (free-run counter) 85, an input/output interface 86, a comparison register 87, a drive circuit 88, an AD converter 89, a multiplexer 90, an edge detecting circuit 91, a waveform shaping circuit 92, and the like.

The one register 87 is provided for each of the injection valve 17 and the ignition system 16. The register 87 can energize and stop energizing the corresponding injection valve 17 and can also energize and stop energizing the corresponding ignition system 16 via the drive circuit 88.

The above-described sensors are connected to the AD converter 89 via the multiplexer 90. The fuel pressure sensor 20 outputs a voltage that corresponds to the fuel pressure. The in-cylinder pressure sensor 21 outputs a voltage that corresponds to the in-cylinder pressure. The coolant temperature sensor 22 outputs a voltage that corresponds to a coolant temperature. The accelerator pedal depression amount sensor 24 outputs a voltage that corresponds to the depression amount of the accelerator pedal 23. The airflow meter 34 outputs a voltage that corresponds to the flow rate of the air flowing therethrough. The ECU 80 uses these voltages to sample (acquire) the fuel pressure, the in-cylinder pressure, the coolant temperature, the accelerator pedal depression amount, and the intake air amount (that is, the amount of the air suctioned into the combustion chamber 11). Noted that the ECU 80 controls an opening degree of the throttle valve 33 in accordance with parameter values that include the acquired accelerator pedal depression amount.

Together with the waveform shaping circuit 92, the crank angle sensor 26 outputs a pulse signal (a rectangular wave signal) each time the crankshaft 25 rotates by a predetermined angle (10° in this example). More specifically, when the crankshaft 25 rotates by 10°, the voltage of the pulse signal is rapidly increased from 0 (V) to a predetermined voltage, then the voltage is maintained, and the voltage is lowered to 0 (V) by the time the crankshaft 25 further rotates by 10°. As will be described below, the ECU 80 uses this pulse signal to sample (acquire) an engine speed. Noted that the engine 10 also includes a cam position sensor (not shown). The cam position sensor outputs a pulse signal only when a certain cylinder (for example, a first cylinder) is at a reference position (for example, the intake top dead center). The ECU 80 detects this pulse signal and, on the basis of this pulse signal and the pulse signal from the crank angle sensor 26, computes an absolute crank angle for which the reference position of the certain cylinder is used as a reference.

In the ECU 80, interrupt processing is executed by the CPU 81 when time indicated by the timer 85 matches predetermined time. This type of the interrupt processing is also referred to as "timer interrupt processing" as a matter of convenience. Furthermore, when the edge detecting circuit 91 detects an leading edge of a pulse that is sent from the crank angle sensor 26 through the waveform shaping circuit 92, the interrupt processing is also executed by the CPU 81. This type of the interrupt processing is also referred to as "edge interrupt processing" as a matter of convenience. In addition, when the time indicated by the timer 85 matches the time set in the register 87, the interrupt processing is also executed by the CPU 81. This type of the interrupt processing is also referred to as "comparison register interrupt processing" as a matter of convenience.

The CPU 81 uses the AD converter 89 to execute AD conversion of the output voltage of the sensor (except the crank angle sensor 26) that is selected by the multiplexer 90 in a predetermined order (an AD conversion schedule). The CPU 81 thereby samples the above-described various types of parameter values (the fuel pressure, the in-cylinder pressure, the coolant temperature, the intake air amount, the accelerator pedal depression amount, and the like). This operation is executed in the timer interrupt processing.

Furthermore, when the edge detecting circuit 91 detects the leading edge of the pulse signal from the crank angle sensor 26, the CPU 81 executes the edge interrupt processing to read the current time from the timer 85. In addition, the CPU 81 computes a time period required for the crankshaft 25 to rotate by 10° from the time that is read during the last detection of the leading edge and the time that is read during the current detection of the leading edge. Then, the CPU 81 samples (acquires) an engine speed NE10 from the time period. Alternatively, the CPU 81 computes a time period required for the crankshaft 25 to rotate by 30° from the time that is read during the last detection of the leading edge and the time that is read during detection of the leading edge executed three times before. Then, the CPU 81 samples (acquires) an engine speed NE30 from the time period.

Actuation of Fuel Injection Control Device

Hereinafter, a Description Will First Made on Fuel Injection Control Regarding the Actuation of the Fuel Injection Control Device that is Configured as Described Above.

Although the details will be described below, in this embodiment, computation of a crank angle at which the fuel injection is initiated (an injection crank angle), computation of a time period in which the injection valve 17 is opened to inject the fuel in a target amount (a fuel injection time period), and computation of a time period that is required for the crank angle to become the injection crank angle from a certain time point (a required time period until the initiation of injection) are executed in either one of a "normal computing mode" and a "shortened computing mode".

The normal computing mode is a mode in which the injection crank angle and the fuel injection time period are computed at normal crank angle intervals (in this example, at the crank angle intervals of 30°) and in which the required time period is computed at the crank angle immediately before the initiation of fuel injection (in this example, any of 0°, 30°, 60°, . . . 660°, 690°, 720° (=0°)) among the crank angles at the normal crank angle intervals.

Meanwhile, the shortened computing mode is a mode in which the injection crank angle and the fuel injection time period are computed at shortened crank angle intervals (in this example, at the crank angle intervals of 10°) that are shorter than the normal crank angle intervals and in which the required time period is computed at the crank angle immediately before the initiation of fuel injection (in this example, any of 0°, 10°, 20°, . . . 700°, 710°, 720° (=0°)) among the crank angles at the shortened crank angle intervals.

Furthermore, in this embodiment, although the details will be described below, setting of the initiation time of fuel injection in the register 87 and acquisition of the fuel injection time period are executed in either one of a normal processing mode and a shortened processing mode. The setting of the initiation time of fuel injection in the register 87 and the acquisition of the fuel injection time period are collectively referred to as injection initiation processing.

The normal processing mode is a mode in which the setting of the initiation time of fuel injection in the register 87 and the acquisition of the fuel injection time period are executed at the crank angle immediately before fuel injection (any of 0°, 30°, 60°, . . . 660°, 690°, 720° (=0°)) among the crank angles at the normal crank angle intervals (at the crank angle intervals of 30°).

Meanwhile, the shortened processing mode is a mode in which the setting of the initiation time of fuel injection in the register 87 and the acquisition of the fuel injection time period are executed at the crank angle immediately before the fuel injection (any of 0°, 10°, 20°, . . . 700°, 710°, 720° (=0°)) among the crank angles at the shortened crank angle intervals (at the crank angle intervals of 10°).

Figure 2A:
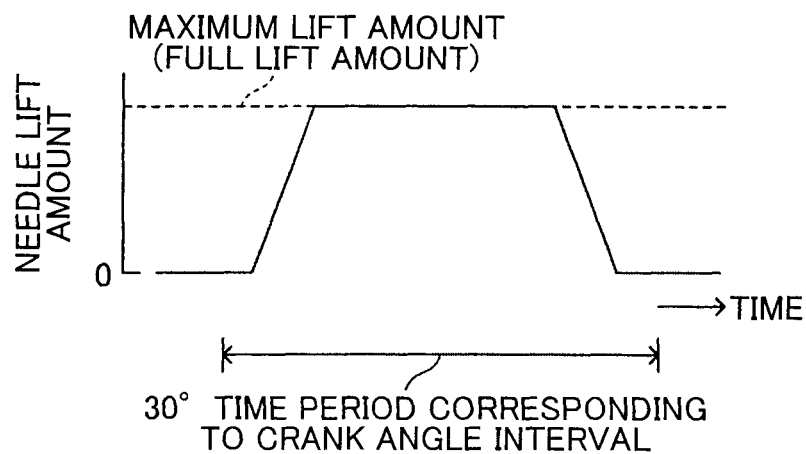
FIG. 2A shows a change in a needle lift amount in full injection.
Figure 2B:
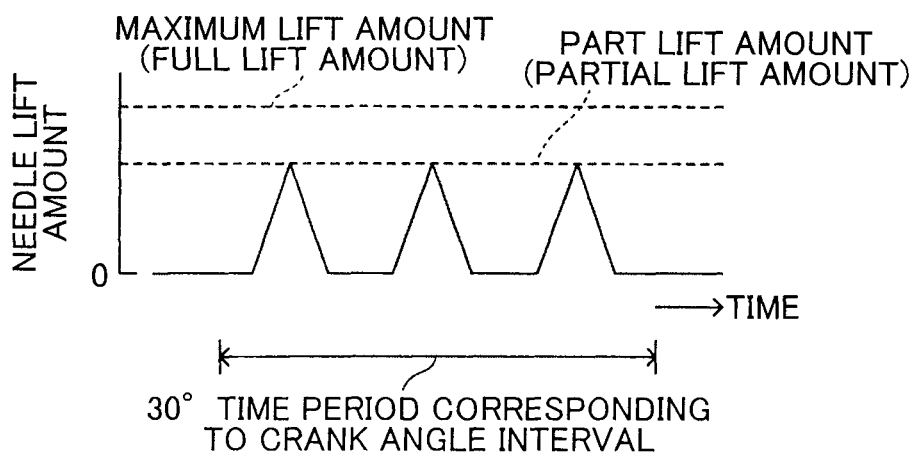
FIG. 2B shows a change in the needle lift amount in partial injection.

Moreover, in this embodiment, full injection and partial injection can selectively be executed. As shown in FIG. 2A, the full injection is fuel injection in which a needle lift amount (that is, a lift amount of a needle valve of the injection valve 17) reaches a maximum lift amount (full lift amount) and then the needle valve starts closing. As shown in FIG. 2B, the partial injection is fuel injection in which the needle valve starts closing before the needle lift amount reaches the maximum lift amount. In other words, the partial injection is fuel injection that is executed by immediately reducing the needle lift amount to zero at a time point at which the needle lift amount is increased from zero to a partial lift amount that is smaller than the maximum lift amount. FIG. 2B shows a change in the needle lift amount when the partial injection is executed three times.

In this embodiment, single-injection control and multi-injection control can be executed. As shown in FIG. 2A, in the single-injection control, fuel injection (in this example, the full injection) is initiated only once within a time period that corresponds to the normal crank angle interval (at the crank angle interval of 30°). As shown in FIG. 2B, in the multi-injection control, fuel injection (in this example, the partial injection) is initiated plural times (in this example, three times in a continuous manner) within the time period that corresponds to the normal crank angle interval.

Figure 3:
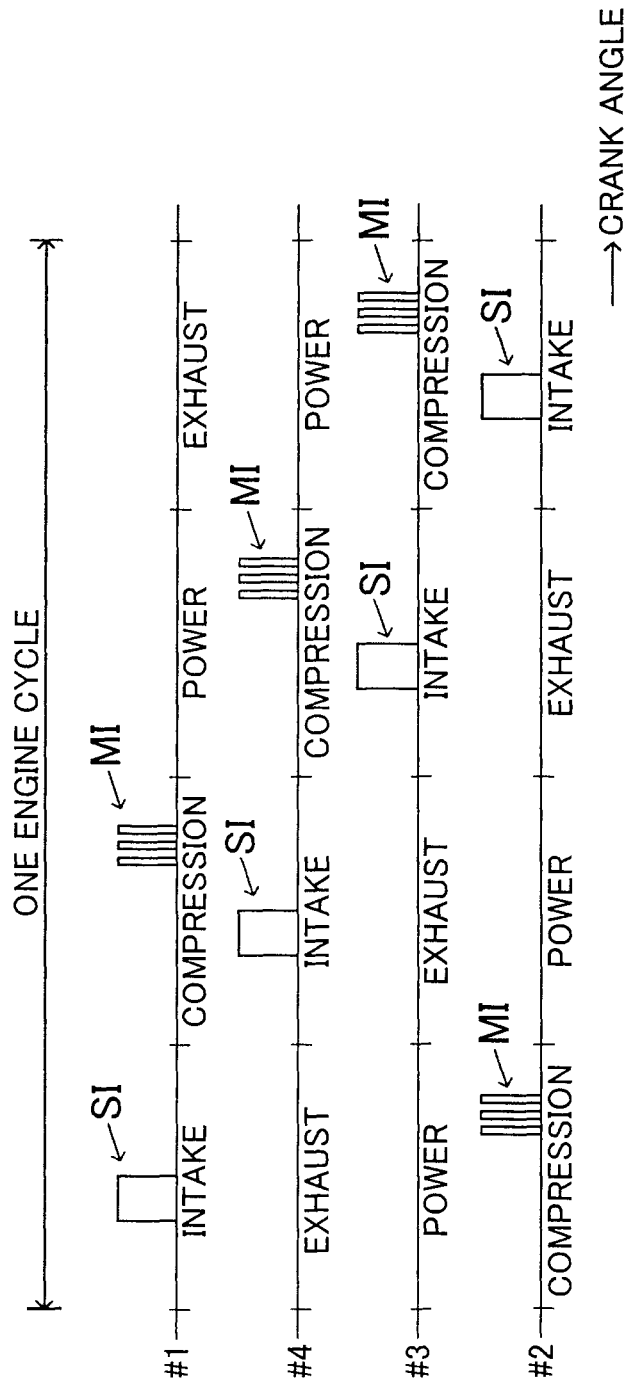
FIG. 3 is a time chart that indicates fuel injection in each cylinder in the case where single-injection control and multi-injection control are executed in one engine cycle.

In this embodiment, when a cold start condition or a rapid catalyst warming condition is satisfied, as shown in FIG. 3, in one engine, cycle of each of cylinders #1 to #4, single-injection control SI is executed in a middle stage of an intake stroke, and multi-injection control MI is executed in a late stage of a compression stroke. On the other hand, when neither the cold start condition nor the rapid catalyst warming condition is satisfied, as shown in FIG. 4, in the one engine cycle of each of the cylinders #1 to #4, only the single-injection control SI is executed in the middle stage of the intake stroke.

Figure 4:
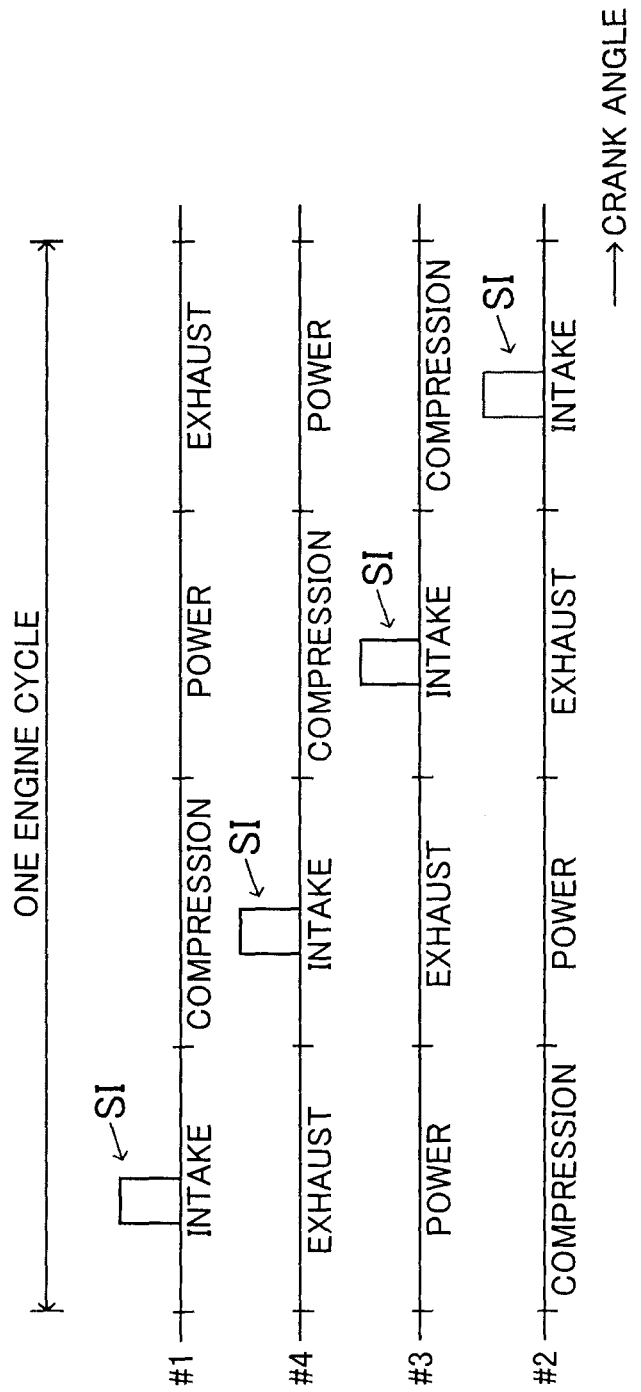
FIG. 4 is a time chart that indicates fuel injection in the each cylinder in the case where only the single-injection control is executed in one engine cycle.

In FIG. 3 and FIG. 4, #1 to #4 respectively show the first cylinder, a second cylinder, a third cylinder, and a fourth cylinder. Furthermore, the one engine cycle is a time period in which strokes of intake, compression, power, and exhaust are sequentially executed in one cylinder. In the case of a four-cycle reciprocating internal combustion engine, the one engine cycle is a time period in which the crank angle is advanced by 720°.

The cold start condition is satisfied in the case where an engine temperature (that is, a temperature of the engine 10 that is estimated on the basis of the output voltage of the coolant temperature sensor 22) is lower than a predetermined engine temperature when an engine start request is generated. Then, the cold start condition is dissatisfied thereafter in the case where the engine speed becomes at least equal to a predetermined speed (in the case where the engine start is completed). The cold start is the engine start in a state that the engine temperature is lower than the predetermined engine temperature.

Furthermore, the rapid catalyst warming condition is satisfied in the case where the catalyst temperature is lower than the activating temperature after the engine start request is generated and when the engine speed becomes at least equal to the predetermined speed (when the engine start is completed). The rapid catalyst warming condition is dissatisfied in the case where the catalyst temperature becomes at least equal to the activation temperature. Rapid catalyst warming is catalyst warming in which the catalyst temperature is increased to be at least equal to the activating temperature in a short time period after the completion of the engine start. For example, the catalyst temperature is estimated on the basis of the output voltage of the coolant temperature sensor 22.

Fuel injection at a time when the cold start condition or the rapid catalyst warming condition is satisfied will be described specifically. In this embodiment, as shown in FIG. 3, in an arbitrary cylinder #N (N: 1 to 4), when the crank angle becomes the full injection crank angle in the middle stage of the intake stroke (the crank angle at which the full injection should be initiated), energization of the injection valve 17 in the cylinder is initiated. Then, the energization continues over a full injection time period (the fuel injection time period for realizing the full injection). The full injection (single-injection control) is executed in this way. As will be described below, the full injection time period is computed on the basis of plural types of the sampled parameter values that represent an engine state.

Furthermore, as shown in FIG. 3, when the crank angle becomes each of a first partial injection crank angle, a second partial injection crank angle, and a third partial injection crank angle (each of the crank angles at which the partial injection should be initiated) in the late stage of the compression stroke, the energization of the injection valve 17 in the cylinder is initiated. Then, the energization continues over each of the first to third partial injection time periods (the fuel injection time period for realizing the first to third partial injection). The first to third partial injection (multi-injection control) is executed in this way. As will be described below, the first to third partial injection time periods is computed on the basis of plural types of the sampled parameter values that represent the engine state.

Noted that, in reality, even when the energization of the injection valve 17 is initiated, the injection valve 17 is not opened immediately. The fuel starts being injected after a certain time period has elapsed since the energization of the injection valve 17 is initiated. As described above, a time period from the initiation of the energization of the injection valve 17 to the initiation of fuel injection is referred to as an "disabled injection time period". This disabled injection time period is included in each of the fuel injection time periods.

On the other hand, fuel injection at a time when neither the cold start condition nor the rapid catalyst warming condition is satisfied will be described specifically. In this embodiment, as shown in FIG. 4, in the arbitrary cylinder #N (N: 1 to 4), when the crank angle becomes the full injection crank angle in the middle stage of the intake stroke (the crank angle at which the full injection should be initiated), the energization of the injection valve 17 in the cylinder is initiated. Then, the energization continues over the full injection time period. The full injection (single-injection control) is executed in this way. As will be described below, the full injection time period in this case is also computed on the basis of the plural types of the sampled parameter values that represent the engine state.

Overview of Fuel Injection

Next, a description will be made on an overview of the actuation of the ECU 80 for realizing the above-described fuel injection with reference to FIG. 5A to FIG. 7B.

1. Realization of Full Injection

Figure 5A:
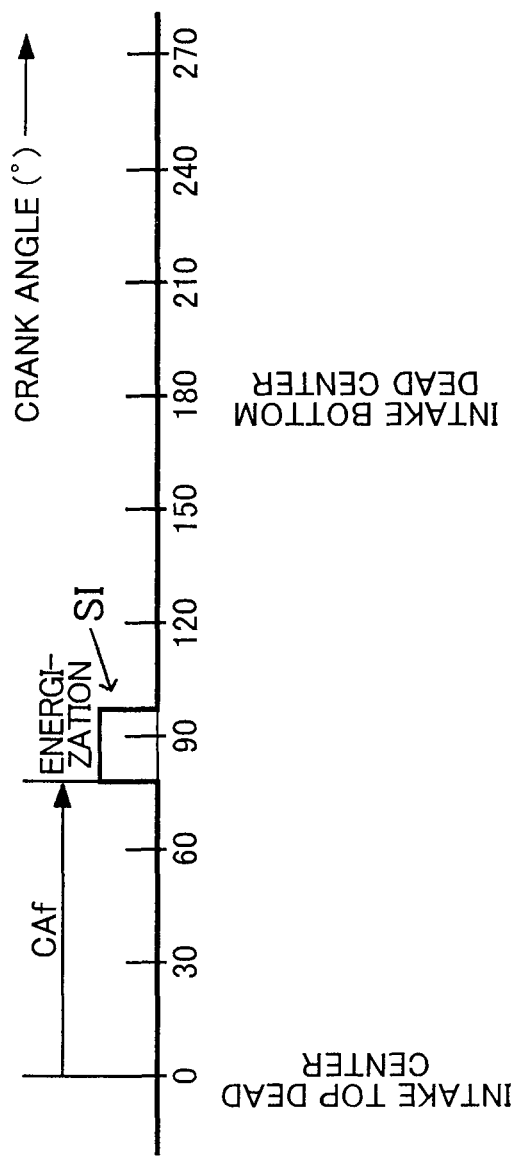
FIG. 5A is a time chart that indicates energization to a fuel injection valve in the case where the single-injection control is executed.

A description will first be made on a case where, in order to realize the one full injection of the single-injection control SI, as shown in FIG. 5A, an engine load KL, fuel pressure Pf, and in-cylinder pressure Pc are sampled in a predetermined order (in the AD conversion schedule) in the timer interrupt processing each time a certain time period T1 elapses and where sampling of an engine speed NE and computation for injection are executed in the edge interrupt processing each time the crank angle is advanced by 30° with the crank angle of 0° being set as a start point.

In this case, the computation for injection means to calculate a control value required for the full injection (in this example, the full injection crank angle and the full injection time period) on the basis of various types of the parameter values (in this example, engine speed NE30, the engine load KL, the fuel pressure Pf, and the in-cylinder pressure Pc).

Furthermore, in this case, as described above, the engine speed NE to be sampled is the engine speed NE30 that is computed from the time period that is required for the crankshaft 25 to rotate by 30°.

In addition, each time the certain time period T1 elapses, an intake air amount Ga is sampled on the basis of the output voltage of the airflow meter 34. In reality, each time the intake air amount Ga is sampled, the engine load KL is computed on the basis of the sampled intake air amount Ga and the latest engine speed NE30 at the time point among the engine speeds NE30 that are sampled at the crank angle intervals of 30°, which will be described below. Such a computing operation (acquiring operation) of the engine load KL is referred to as sampling of the engine load KL.

Figure 8A:
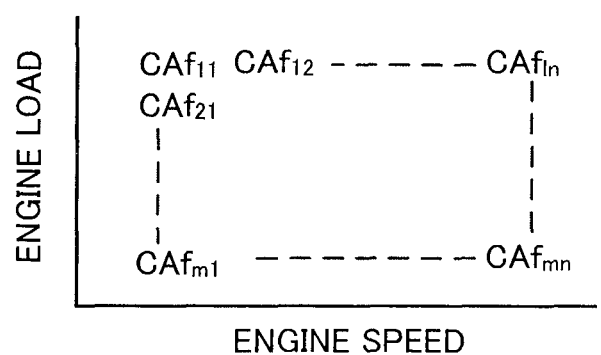
FIG. 8A is a lookup table that is referred when the fuel injection timing CAf of the full injection is determined (computed)

The computation for injection will be described specifically. In the each computation for injection that is executed at the crank angle intervals of 30° (that is, the crank angles of 0°, 30°, 60°, 90°, . . . 660°, 690°, 720° (=0°)), on the basis of the latest engine speed NE30 and the latest engine load KL at the time point (that is, the latest parameter values), the CPU 81 of the ECU 80 determines (computes) a full injection crank angle (the crank angle at which the full injection should be initiated) CAf from a lookup table shown in FIG. 8A. The CPU 81 also computes a full injection time period (the fuel injection time period for realizing the full injection) TAUf on the basis of the latest engine speed NE30, the latest engine load KL, the latest fuel pressure Pf, and the latest in-cylinder pressure Pc at the time point (that is, the latest parameter values).

In this example, the latest engine speed NE30 that is used for the each computation for injection is NE30 that is sampled at the crank angle at which the each computation for injection is executed. The latest engine load KL, the latest fuel pressure Pf, and the latest in-cylinder pressure Pc that are used for the each computation for injection are respectively KL, Pf, and Pc that are sampled at a time point that is the closest in terms of time to a time point at which the each computation for injection is executed.

Noted that the full injection crank angle is represented by the crank angle from an intake top dead center (the crank angle of 0°) in the cylinder in which the full injection is executed.

Next, the CPU 81 determines whether the crank angle becomes the full injection crank angle CAf within a time period from the current time point to a time point at which the crank angle becomes a crank angle (that is, the crank angle that is advanced by 30°) at which the next computation for injection (the computation for injection based on the next edge interrupt processing) is executed. When the crank angle does not become the full injection crank angle CAf within the time period from the current time point to the time point at which the crank angle becomes the crank angle at which the next computation for injection is executed, the CPU 81 does not execute the additional computation for injection and processing (injection initiation processing) for initiating the energization of the injection valve 17 (the full injection).

In this case, the additional computation for injection means to calculate a time period that is required for the crank angle to become the full injection crank angle CAf from the current time point (the required time period until the initiation of the full injection). Furthermore, the injection initiation processing means to set the time at which the crank angle becomes the full injection crank angle CAf (the initiation time of the full injection) in the register 87 and to acquire the latest full injection time period TAUf at the time point.

Figure 5B:
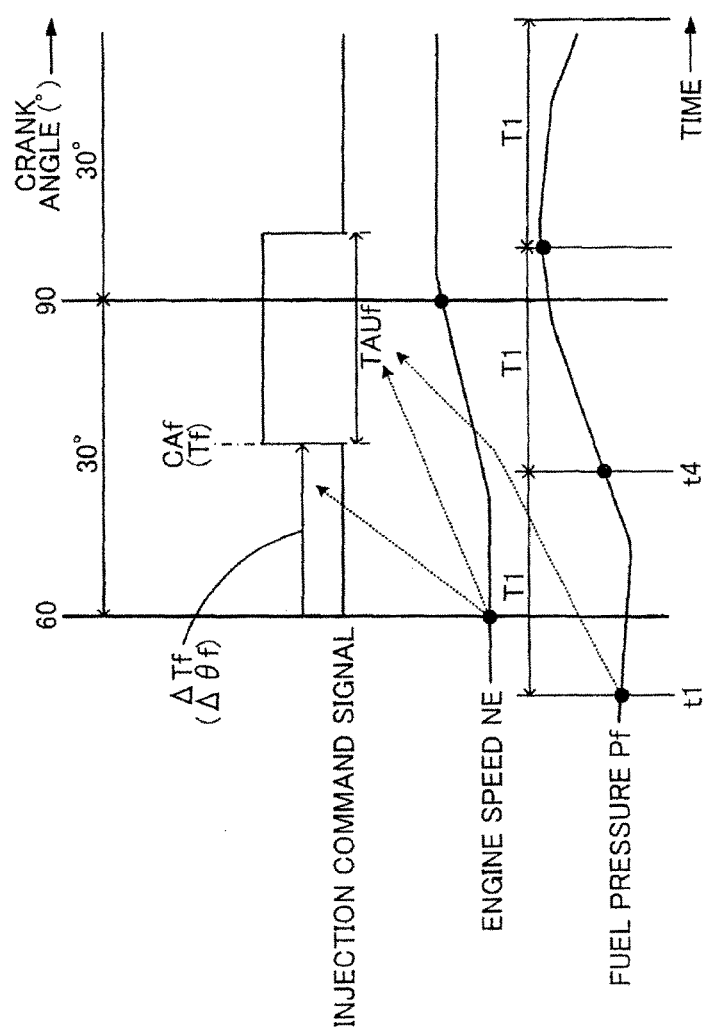
FIG. 5B is a time chart that indicates control values on the full injection (fuel injection timing CAf of the full injection and a fuel injection time period TAUf of the full injection) as well as an engine speed NE and fuel pressure Pf when a predetermined crank angle interval is a crank angle interval of 30° in the case where the single-injection control is executed.

In an example shown in FIG. 5B, the crank angle becomes the full injection crank angle CAf between 60° and 90°. Accordingly, in the computation for injection based on the edge interrupt processing that is executed when the crank angle becomes 60°, the CPU 81 determines that the crank angle becomes the full injection crank angle CAf within the time period from the current time point to the time point at which the crank angle becomes the crank angle at which the next computation for injection is executed (that is, the crank angle of 90°). Next, the CPU 81 executes the additional computation for injection, which is followed by the injection initiation processing.

In the additional computation for injection, on the basis of the latest engine speed NE30 at the time point, the CPU 81 converts (computes) a difference $\Delta\theta f$ between the full injection crank angle CAf (latest control value) and the crank angle of 60° to a time period (that is, the required time period until the initiation of full injection) $\Delta Tf$ that is required for the crank angle to become the full injection crank angle CAf from the current time point (the time point at which the crank angle becomes 60°). In this example, the latest engine speed NE30 that is used for this conversion is NE30 that is sampled when the crank angle is 60°.

In the following injection initiation processing, the CPU 81 sets time (initiation time of the full injection) Tf for which the required time period $\Delta Tf$ (the latest control value) is added to the current time indicated by the timer 85 in the register 87. The register 87 corresponds to the injection valve 17, in which the full injection should be executed. In addition, the CPU 81 sets an injection initiation flag of the register 87. Furthermore, the CPU 81 acquires the latest full injection time period TAUf (the latest control value) at the time point and stores it in the memory.

In this example, the latest acquired full injection time period TAUf is TAUf that is computed in the computation for injection, the computation for injection based on the edge interrupt processing that is executed when the crank angle becomes 60°. Furthermore, the engine speed NE30 that is used to compute the latest acquired full injection time period TAUf is NE30 (the latest parameter value) that is sampled at the crank angle of 60°. In addition, the engine load KL, the fuel pressure Pf, and the in-cylinder pressure Pc that are used for the same computation are respectively KL, Pf, and Pc (the latest parameter values) that are sampled at a time point closest in terms of time to the time point at which the crank angle is 60°. As for the fuel pressure, the fuel pressure that is used in the same computation is the fuel pressure sampled at time t1 in FIG. 5.

As a result of this, when the time indicated by the timer 85 (timer time) matches the initiation time of the full injection Tf that is set in the register 87, as shown in FIG. 5B, an injection command signal is issued for the injection valve 17. Then, the energization of the injection valve 17 is initiated, and the comparison register interrupt processing is executed by the CPU 81. In this interrupt processing, the CPU 81 sets time (termination time of the full injection) Te, in which the full injection time period TAUf stored in the memory is added to the timer time at the time point, in the register 87. In addition, the CPU 81 sets an injection termination flag of the register 87.

As a result of this, when the timer time matches the termination time of the full injection Te that is set in the register 87 (that is, when the full injection time period TAUf elapses), the energization of the injection valve 17 is stopped. As a result of the above, the injection valve 17 is energized only for the full injection time period TAUf from the time Tf at which the crank angle is estimated to match the full injection crank angle CAf. The full injection is executed in this way.

2. Problems when the Partial Injection is Realized in the Same Manner as the Full Injection Next, a description will be made on problems that arise when the partial injection of three times in the multi-injection control MI is realized in the same manner as the full injection with reference to FIG. 6A and FIG. 6B.

In this case, as in the case where the full injection is executed, the CPU 81 samples the engine load KL, the fuel pressure Pf, and the in-cylinder pressure Pc in the predetermined order (the AD conversion schedule) in the timer interrupt processing each time the certain time period T1 elapses. The CPU 81 also executes the sampling of the engine speed NE and the computation for injection in the edge interrupt processing each time the crank angle is advanced by 30° with the crank angle of 0° being set as the start point.

In this case, the computation for injection means to calculate the control values required for the partial injection (in this example, the first to third partial injection crank angles and the first to third partial injection time periods) on the basis of various types of the parameter values (in this example, the engine speed NE, the engine load KL, the fuel pressure Pf, and the in-cylinder pressure Pc).

Furthermore, also in this case, the engine speed NE to be sampled is the above-described engine speed NE30.

In addition, also in this case, the intake air amount Ga is sampled on the basis of the output voltage of the airflow meter 34 each time the certain time period T1 elapses. Then, each time the intake air amount Ga is sampled, the engine load KL is computed on the basis of the sampled intake air amount Ga and the latest engine speed NE30 at the time point among the engine speeds NE30 that are sampled at the crank angle intervals of 30°.

Figure 8B:
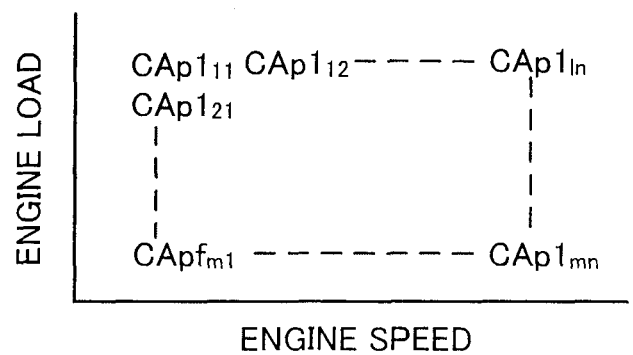
FIG. 8B is a lookup table that is referred when fuel injection timing CAp1 of a first partial injection is determined (computed)

The computation for injection in this case will be described specifically. In the each computation for injection that is executed at the crank angle intervals of 30°, on the basis of the latest engine speed NE30 and the latest engine load KL at the time point, the CPU 81 determines (computes) the first partial injection crank angle (a crank angle at which the first partial injection should be initiated) CAp1 from a lookup table in FIG. 8B. The CPU 81 also computes a first partial injection time period (the fuel injection time period for realizing the first partial injection) TAUp1 on the basis of the latest engine speed NE30, the latest engine load KL, the latest fuel pressure Pf, and the latest in-cylinder pressure Pc at the time point.

Furthermore, the CPU 81 computes the second partial injection crank angle (a crank angle at which the second partial injection should be initiated) CAp2 by adding a predetermined crank angle a° to the first partial injection crank angle CAp1 that is computed. The CPU 81 also computes the third partial injection crank angle (a crank angle at which the third partial injection should be initiated) CAp3 by adding the predetermined crank angle a° to this second partial injection crank angle. In addition, on the basis of the latest engine speed NE30, the latest engine load KL, the latest fuel pressure Pf, and the latest in-cylinder pressure Pc at the time point, the CPU 81 computes the second and third partial injection time periods (the fuel injection time periods for respectively realizing the second and third partial injection) TAUp2 and TAUp3.

Also, in this example, the latest engine speed NE30 that is used for the each computation for injection is NE30 that is sampled at the crank angle at which the each computation for injection is executed. The latest engine load KL, the latest fuel pressure Pf, and the latest in-cylinder pressure Pc that are used for the each computation for injection are respectively KL, Pf, and Pc that are sampled at the time point that is the closest in terms of time to the time point at which the each computation for injection is executed.

Noted that the partial injection crank angle is represented by the crank angle from the intake top dead center (the crank angle of 0°) in the cylinder in which the partial injection is executed.

Next, the CPU 81 determines whether the crank angle becomes either one of the partial injection crank angles CAp1 to CAp3 in a time period from the current time point to a time point at which the crank angle becomes a crank angle (that is, the crank angle that is advanced by 30°) at which the next computation for injection (the computation for injection based on the next edge interrupt processing) is executed. If the crank angle does not become any of "the partial injection crank angles CAp1 to CAp3" within the period from the current time point to the time point at which the crank angle becomes the crank angle at which the next computation for injection is executed, the CPU 81 does not execute the additional computation for injection and processing (the injection initiation processing) for initiating the energization of the injection valve 17.

In this case, the additional computation for injection means to calculate a time period (the required time period until the initiation of the partial injection) that is required for the crank angle to become any of the subject partial injection crank angles CAp1 to CAp3 from the current time point (the partial injection crank angle before the crank angle at which the next computation for injection is executed).

Furthermore, the injection initiation processing means to set the time (the initiation time of the partial injection) at which the crank angle becomes any of the subject partial injection crank angles CAp1 to CAp3 (the partial injection crank angle before the crank angle at which the next computation for injection is executed) in the register 87, and to acquire the latest one of partial injection time periods TAUp1 to TAUp3 at the time point (the fuel injection period for realizing the partial injection in which the injection should be initiated at the subject partial injection crank angle).

Figure 6B:
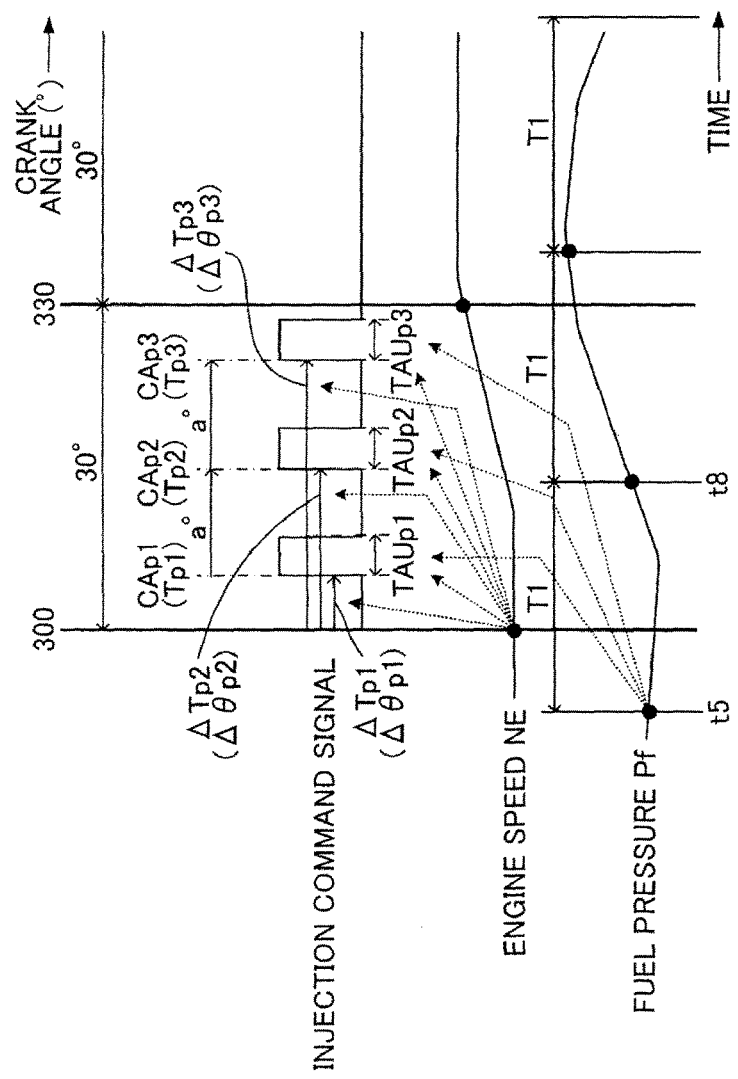
FIG. 6B is a time chart that indicates control values on the partial injection (fuel injection timing CAp1 to CAp3 of the partial injection and fuel injection time periods TAUp1 to TAUp3 of the partial, injection) as well as the engine speed NE and the fuel pressure Pf when the predetermined crank angle interval is the crank angle interval of 30° in the case where the multi-injection control is executed.

In an example shown in FIG. 6B, the crank angle becomes all of the partial injection crank angles CAp1 to CAp3 from 300° to 330°. Accordingly, in the computation for injection based on the edge interrupt processing that is executed when the crank angle becomes 300°, the CPU 81 determines that the crank angle becomes all of the partial injection crank angles CAp1 to CAp3 from the current time point to the time point at which the crank angle becomes the crank angle at which the next computation for injection is executed (that is, the crank angle of 330°). Next, the CPU 81 executes the additional computation for injection, which is followed by the injection initiation processing.

In the additional computation for injection, on the basis of the latest engine speed NE30 at the time point, the CPU 81 respectively converts (computes) each of differences Δθp1 to Δθp3 between each of the partial injection crank angles CAp1 to CAp3 (the latest control value) and the crank angle of 300° to each of time periods (that is, each of the required time periods until the initiation of the first to third partial injections) ΔTp1 to ΔTp3 that is required for the crank angle to become each of the partial injection crank angles CAp1 to CAp3 from the current time point (the time point at which the crank angle becomes 300°). In this example, the latest engine speed NE30 that is used for this conversion is NE30 that is, sampled at the crank angle of 300°.

In the following injection initiation processing, the CPU 81 sets time (initiation time of the first partial injection) Tp1 for which the required time period ΔTp1 (the latest control value) is added to the current time indicated by the timer 85 in the register 87 that corresponds to the injection valve 17 in which the first partial injection should be executed. In, addition, the CPU 81 stores each of time (initiation time of each of the second and third partial injections) Tp2 and Tp3 for which each of the required time periods ΔTp2 and ΔTp3 (the latest control value) is added to the current time in the memory. Furthermore, the CPU 81 sets the injection initiation flag of the register 87. Moreover, the CPU 81 acquires the latest one of first to third partial injection time periods TAUp1 to TAUp3 (the latest control value) at the time point and stores it in the memory.

In this example, the acquired first to third partial injection time periods TAUp1 to TAUp3 are TAUp1 to TAUp3 that are computed in the computation for injection based on the edge interrupt processing that is executed when the crank angle becomes 300°. Furthermore, the engine speed NE30 that is used to compute the latest first to third partial injection time periods TAUp1 to TAUp3 that are acquired is NE30 (the latest parameter value) that is sampled at the crank angle of 300°. In addition, the engine load KL, the fuel pressure Pf, and the in-cylinder pressure Pc that are used in the same computation are respectively KL, Pf, and Pc (the latest parameter values) that are sampled at the time point closest in terms of time to the time point at which the crank angle is 300°. As for the fuel pressure, the fuel pressure that is used for the same computation is the fuel pressure that is sampled at time t5 in FIG. 6.

As a result of this, when the time indicated by the timer 85 (the timer time) matches the initiation time of the first partial injection Tp1, which is set in the register 87, as shown in FIG. 6B, the injection command signal is issued with respect to the injection valve 17. Then, the energization of the injection valve 17 is initiated, and the comparison register interrupt processing is executed by the CPU 81. In this interrupt processing, the CPU 81 sets the time (termination time of the first partial injection) Te in which the first partial injection time period TAUp1 stored in the memory is added to the timer time at the time point in the register 87. In addition, the CPU 81 sets the injection termination flag of the register 87.

As a result of this, when the timer time matches the termination time of the first partial injection Te, which is set in the register 87 (that is, when the first partial injection time period TAUp1 elapses), the energization of the injection valve 17 is stopped. As a result of the above, the injection valve 17 is energized only for the first partial injection time period TAUp1 from the time Tp1 at which the crank angle is estimated to match the first partial injection crank angle CAp1. The first partial injection is executed in this way.

Furthermore, once the first partial injection is terminated (that is, the energization of the injection valve 17 is stopped), the comparison register interrupt processing is executed by the CPU 81. In this interrupt processing, the CPU 81 sets the initiation time of the second partial injection Tp2 that is stored in the memory in the register 87 that corresponds to the injection valve 17. In addition, the CPU 81 sets the injection initiation flag of the register 87.

As a result of this, when the timer time matches the initiation time of the second partial injection Tp2, which is set in the register 87, as shown in FIG. 6B, the injection command signal is issued with respect to the injection valve 17. Then, the energization of the injection valve 17 is initiated, and the comparison register interrupt processing is executed by the CPU 81. In this interrupt processing, the CPU 81 sets the time (the termination time of the second partial injection) Te for which the second partial injection time period TAUp2 stored in the memory is added to the timer time at the time point in the register 87. In addition, the CPU 81 sets the injection termination flag of the register 87.

As a result of this, when the timer time matches the termination time of the second partial injection Te, which is set in the register 87 (that is, when the second partial injection time period TAUp2 elapses), the energization of the injection valve 17 is stopped. As a result of the above, the injection valve 17 is energized only for the second partial injection time period TAUp2 from the time Tp2 at which the crank angle is estimated to match the second partial injection crank angle CAp2. The second partial injection is executed in this way.

Furthermore, once the second partial injection is terminated (that is, when the energization of the injection valve 17 is stopped), the comparison register interrupt processing is executed by the CPU 81. In this interrupt processing, the CPU 81 sets the initiation time of the third partial injection Tp3 stored in the memory in the register 87 that corresponds to the injection valve 17. In addition, the CPU 81 sets the injection initiation flag of the register 87.

As a result of this, when the timer time matches the initiation time of the third partial injection Tp3, which is set in the register 87, as shown in FIG. 6B, the injection command signal is issued with respect to the injection valve 17. Then, the energization of the injection valve 17 is initiated, and the comparison register interrupt processing is executed by the CPU 81. In this interrupt processing, the CPU 81 sets the time (the termination time of the third partial injection) Te for which the third partial injection time period TAUp3 stored in the memory is added to the timer time at the time point in the register 87. In addition, the CPU 81 sets the injection termination flag of the register 87.

As a result of this, when the timer time matches the termination time of the third partial injection Te, which is set in the register 87 (that is, when the third partial injection time period TAUp3 elapses), the energization of the injection valve 17 is stopped. As a result of the above, the injection valve 17 is energized only for the third partial injection time period TAUp3 from the time Tp3 at which the crank angle is estimated to match the third partial injection crank angle CAp3. The third partial injection is executed in this way.

As shown in FIG. 6B, the engine speed NE and/or the fuel pressure Pf may change during execution of the multi-injection control (that is, within a time period from the initiation of the first partial injection to the termination of the third partial injection). Even in this case, however, in the example shown in FIG. 6B, the engine speed NE and the fuel pressure Pf before the change (that is, the engine speed NE at the crank angle of 300° and the fuel pressure Pf at the time t5) are used for the computation of the second and third partial injection time periods TAUp2 and TAUp3 and the required time periods until the initiation of the second and third partial injections ΔTp2 and ΔTp3. For this reason, the engine speed NE and the fuel pressure Pf that are used for this computation are significantly deviated from the engine speed NE and the fuel pressure Pf at the initiation times of the second and third partial injections Tp2 and Tp3, respectively.

Needless to say, the engine load KL and/or the in-cylinder pressure Pc may also change during the execution of the multi-injection control. Also, in this case, the engine load KL and the in-cylinder pressure Pc before the change are used for the computation of the second and third partial injection time periods TAUp2 and TAUp3. In this case, the engine load KL and the in-cylinder pressure Pc that are used in this computation are also significantly deviated from the engine load KL and the in-cylinder pressure Pc at the initiation times of the second and third partial injections Tp2 and Tp3.

For the reasons described above, even when the second and third partial injections are executed by using the computed TAUp2 and TAUp3 as well as the computed ΔTp2 and ΔTp3, the appropriate fuel injection may not be realized in the each partial injection.

3. Realization of the Partial Injection in the Case where Execution Intervals of the Computation for Injection are Shortened.

A description will next be made on a case where the execution interval of the computation for injection is shortened to a crank angle interval of 10° and the partial injection of the multi-injection control is realized with reference to FIG. 7A to FIG. 7B. In this case, the CPU 81 samples various types of the parameter values (also in this example, the engine load KL, the fuel pressure Pf, and the in-cylinder pressure Pc) in the predetermined order (the AD conversion schedule) in the timer interrupt processing each time the certain time period T1 elapses. The CPU 81 also executes the sampling of the engine speed NE and the computation for injection in the edge interrupt processing each time the crank angle is advanced by 10°.

Also in this case, the computation for injection means to compute the control values required for the partial injection (in this example, the first to third partial injection crank angles and the first to third partial injection time periods) on the basis of various types of the parameter values (in this example, the engine speed NE, the engine load KL, the fuel pressure Pf, and the in-cylinder pressure Pc).

Furthermore, in this case, as described above, the engine speed NE to be sampled is the engine speed NE10 that is computed from a time period that is required for the crankshaft 25 to rotate by 10°.

In addition, the intake air amount Ga is sampled on the basis of the output voltage of the airflow meter 34 each time the certain time period T1 elapses. Each time the intake air amount Ga is sampled, the engine load KL is computed on the basis of the sampled intake air amount Ga and the latest engine speed NE10 at the time point among the engine speeds NE10 that are sampled at the crank angle intervals of 10°.

The computation for injection in this case will be described specifically. In the each computation for injection that is executed at the crank angle intervals of 10° (that is, the crank angles of 0°, 10°, 20°, 30°, . . . 690°, 700°, 710°, 720° (=0°)), on the basis of the latest engine speed NE10 and the latest engine load KL at the time point (that is, the latest parameter values), the CPU 81 determines (computes) the first partial injection crank angle CAp1 from a lookup table shown in FIG. 8B. The CPU 81 also computes the first partial injection time period TAUp1 on the basis of the latest engine speed NE10, the latest engine load KL, the latest fuel pressure Pf, and the latest in-cylinder pressure Pc at the time point.

Furthermore, the CPU 81 computes the second partial injection crank angle CAp2 by adding the predetermined crank angle a° to the computed first partial injection crank angle CAp1. The CPU 81 also computes the third partial injection crank angle CAp3 by adding the predetermined crank angle a° to this second partial injection crank angle. Moreover, the CPU 81 computes each of the second and third partial, injection time periods TAUp2 and TAUp3 on the basis of the latest engine speed NE10, the latest engine load KL, the latest fuel pressure Pf, and the latest in-cylinder pressure Pc at the time point.

Also in this example, the latest engine speed NE10 that is used for the each computation for injection is NE10 that is sampled at the crank angle at which the each computation for injection is executed. The latest engine load KL, the latest fuel pressure Pf, and the latest in-cylinder pressure Pc that are used for the each computation for injection are respectively KL, Pf, and Pc that are sampled at the time point that is the closest in terms of time to the time point at which the each computation for injection is executed.

Next, the CPU 81 determines whether the crank angle becomes any of the partial injection crank angles CAp1 to CAp3 within the time period from the current time point to the time point at which the crank angle becomes a crank angle (that is, the crank angle that is advanced by 10°) at which the next computation for injection (the computation for injection base on the next edge interrupt processing) is executed. If the crank angle does not become any of the partial injection crank angles CAp1 to CAp3 within the time period from the current time point to the time point at which the crank angle becomes the crank angle at which the next computation for injection is executed, the CPU 81 does not execute the additional computation for injection and processing (the injection initiation processing) for initiating the energization of the injection valve 17.

In this case, the additional computation for injection means to calculate the time period (the required time period until the initiation of the partial injection) that is required for the crank angle to become any of the subject partial injection crank angles CAp1 to CAp3 from the current time point (the partial injection crank angle before the crank angle at which the next computation for injection is executed).

Furthermore, the injection initiation processing means to set the time (the initiation time of the partial injection), at which the crank angle becomes the subject partial injection crank angle (the partial injection crank angle before the crank angle at which the next computation for injection is executed); in the register 87, and to acquire the latest partial injection time period at the time point (the fuel injection time period for realizing the partial injection that should be initiated at the subject partial injection crank angle).

Figure 7B:
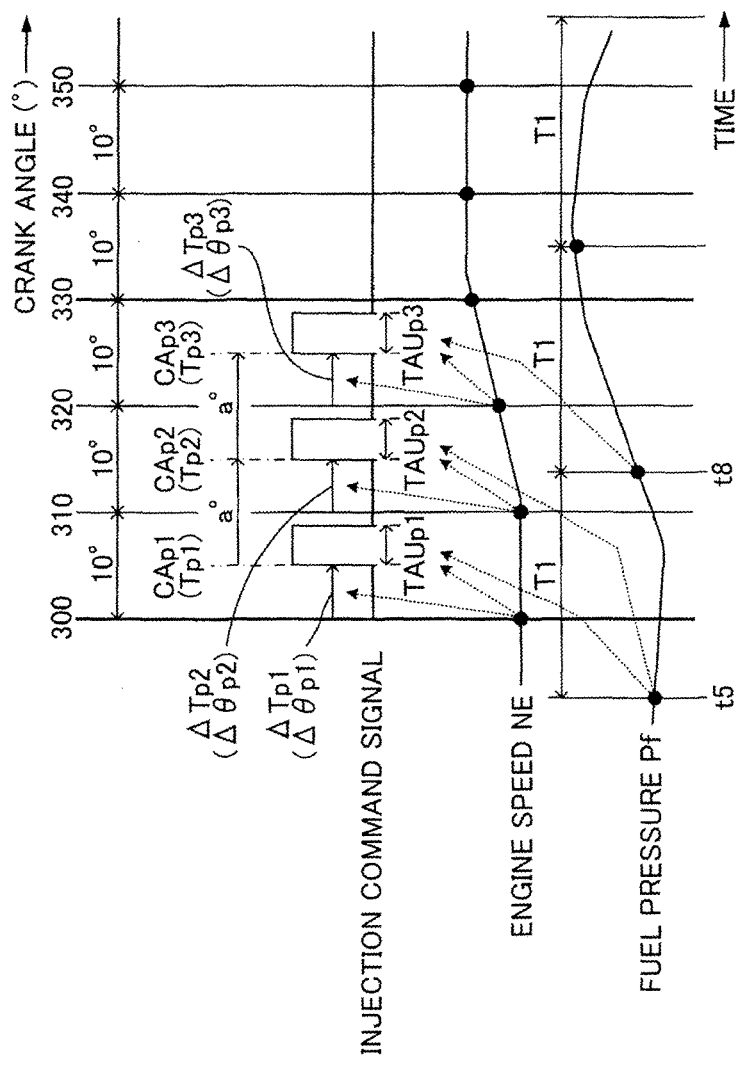
FIG. 7B is similar to FIG. 6B; however.

In the example shown in FIG. 7B, the crank angle becomes the first partial injection crank angle CAp1 between 300° and 310°. Accordingly, in the computation for injection based on the edge interrupt processing that is executed when the crank angle becomes 300°, the CPU 81 determines that the crank angle becomes the first partial injection crank angle CAp1 within the time period from the current time point to the time point at which the crank angle becomes the crank angle (that is, the crank angle of 310°) at which the next computation for injection is executed. Next, the CPU 81 executes the additional computation for injection, which is followed by the injection initiation processing.

In the additional computation for injection, on the basis of the latest engine speed NE10 at the time point, the CPU 81 converts (computes) the difference Δθp1 between the first partial injection crank angle CAp1 (the latest control value) and the crank angle of 300° to the time period (the required time period until the initiation of the first partial injection) ΔTp1 that is required for the crank angle to become the first partial injection crank angle CAp1 from the current time point (the time point at which the crank angle becomes 300°). In this example, the latest engine speed NE10 that is used for this conversion is NE10 that is sampled at the crank angle of 300°.

In the following injection initiation process, the CPU 81 set the time (the initiation time of the first partial injection) TP1 for which the required time period ΔTp1 (the latest control value) is added to the current time indicated by the timer 85 in the register 87 that corresponds to the injection valve 17 in which the first partial injection should be executed. In addition, the CPU 81 sets the injection initiation flag of the register 87. Furthermore, the CPU 81 acquires the latest first partial injection time period TAUp1 (the latest control value) at the time point and stores it in the memory.

In this example, the latest acquired first partial injection time period TAUp1 is TAUp1 that is computed in the computation for injection based on the edge interrupt processing that is executed when the crank angle becomes 300°. Furthermore, the engine speed NE10 that is used to compute the latest acquired first partial injection time period TAUp1 is NE10 (the latest parameter value) that is sampled at the crank angle of 300°. Moreover, the engine load KL, the fuel pressure Pf, and the in-cylinder pressure Pc that are used for the same computation are respectively KL, Pf, and Pc (the latest parameter values) that are sampled at the time point closest in terms of time to the time point at which the crank angle becomes 300°. As for the fuel pressure, the fuel pressure that is used for the same computation is the fuel pressure that is sampled at the time t5 in FIG. 7B.

As a result, if the time indicated by the timer 85 (the timer time) matches the initiation time of the first partial injection Tp1 that is set in the register 87, as shown in FIG. 7B, the injection command signal is issued with respect to the injection valve 17. Then, the energization of the injection valve 17 is initiated, and the comparison register interrupt processing is executed by the CPU 81. In this interrupt processing, the CPU 81 sets the time (the termination time of the first partial injection) Te, for which the first partial injection time period TAUp1 stored in the memory is added to the timer time at the time point, in the register 87. In addition, the CPU 81 sets the injection termination flag of the register 87.

As a result of this, when the timer time matches the termination time of the first partial injection Te that is set in the register 87 (that is, when the first partial injection time period TAUp1 elapses), the energization of the injection valve 17 is stopped. As a result of the above, the injection valve 17 is energized only for the first partial injection time period TAUp1 from the time Tp1 at which the crank angle is estimated to match the first partial injection crank angle CAp1. The first partial injection is executed in this way.

Furthermore, in the example shown in FIG. 7B, the crank angle becomes the second partial injection crank angle CAp2 between 310° and 320°. Accordingly, in the computation for injection based on the edge interrupt processing that is executed when the crank angle becomes 310°, the CPU 81 determines that the crank angle becomes the second partial injection crank angle CAp2 within the time period from the current time point to the time point at which the crank angle becomes a crank angle at which the next computation for injection is executed (that is, the crank angle of 320°). Next, the CPU 81 executes the additional computation for injection, which is followed by the injection initiation processing.

In the additional computation for injection, on the basis of the latest engine speed NE10 at the time point, the CPU 81 converts (computes) the difference $\Delta\theta p2$ between the second partial injection crank angle CAp2 (the latest control value) and the crank angle of 310° to the time period (the required time period until the initiation of the second partial injection) $\Delta Tp2$ that is required for the crank angle to become the second partial injection crank angle CAp2 from the current time point (the time point at which the crank angle becomes 310°). In this example, the latest engine speed NE10 that is used for this conversion is NE10 that is sampled at the crank angle of 310°.

In the following injection initiation processing, the CPU 81 sets the time (the initiation time of the second partial injection) Tp2 for which the required time period $\Delta Tp2$ (the latest control value) is added to the current timer time in the register 87 that corresponds to the injection valve 17 in which the second partial injection should be executed. In addition, the CPU 81 sets the injection initiation flag of the register 87. Furthermore, the CPU 81 acquires the latest second partial injection time period TAUp2 (the latest control value) at the time point and stores it in the memory.

In this example, the latest acquired second partial injection time period TAUp2 is TAUp2 that is computed in the computation for injection based on the edge interrupt processing that is executed when the crank angle becomes 310°. Furthermore, the engine speed NE10 that is used to compute the latest acquired second partial injection time period TAUp2 is NE10 (the latest parameter value) that is sampled at the crank angle of 310°. Moreover, the engine load KL, the fuel pressure Pf, and the in-cylinder pressure Pc that are used for the same computation are respectively KL, Pf, and Pc (the latest parameter values) that are sampled at the time point closest in terms of time to the time point at which the crank angle becomes 310°. As for the fuel pressure, the fuel pressure that is used for the same computation is the fuel pressure that is sampled at the time t5 in FIG. 7B.

As a result of this, when the timer time matches the initiation time of the second partial injection Tp2 that is set in the register 87, as shown in FIG. 7B, the injection command signal is, issued with respect to the injection valve 17. Then, the energization of the injection valve 17 is initiated, and the comparison register interrupt processing is executed by the CPU 81. In this interrupt processing, the CPU 81 sets the time (the termination time of the second partial injection) Te for which the second partial injection time period TAUp2 stored in the memory is added to the timer time at the time point in the register 87. In addition, the CPU 81 sets the injection termination flag of the register 87.

As a result of this, when the timer time matches the termination time of the second partial injection Te that is set in the register 87 (that is, when the second partial injection time period TAUp2 elapses), the energization of the injection valve 17 is stopped. As a result of the above, the injection valve 17 is energized only for the second partial injection time period TAUp2 from the time Tp2 at which the crank angle is estimated to match the second partial injection crank angle CAp2. The second partial injection is executed in this way.

Furthermore, in the example shown in FIG. 7B, the crank angle becomes the third partial injection crank angle CAp3 between 320° and 330°. Accordingly, in the computation for injection that is based on the edge interrupt processing that is executed when the crank angle becomes 320°, the CPU 81 determines that the crank angle becomes the third partial injection crank angle CAp3 within the time period from the current time point to the time point at which the crank angle becomes a crank angle at which the next computation for injection is executed (that is, the crank angle of 330°). Next, the CPU 81 executes the additional computation for injection, which is followed by the injection initiation processing.

In the additional, computation for injection, on the basis of the latest engine speed NE10 at the time point, the CPU 81 converts (computes) the difference $\Delta\theta p3$ between the third partial injection crank angle CAp3 (the latest control value) and the crank angle of 320° to the time period (the required time period until the initiation of the third partial injection) $\Delta Tp3$ that is required for the crank angle to become the third partial injection crank angle CAp3 from the current time point (the time point at which the crank angle becomes 320°). In this example, the latest engine speed NE10 that is used for this conversion is NE10 that is sampled at the crank angle of 320°.

In the following injection initiation processing, the CPU 81 sets the time (the initiation time of the third partial injection) Tp3 for which the required time period $\Delta Tp3$ (the latest control value) is added to the current timer time in the register 87 that corresponds to the injection valve 17 in which the third partial injection should be executed. In addition, the CPU 81 sets the injection initiation flag of the register 87. Furthermore, the CPU 81 acquires the latest third partial injection time period TAUp3 (the latest control value) at the time point and stores it in the memory.

In this example, the latest acquired third partial injection time period TAUp3 is TAUp3 that is computed in the computation for injection based on the edge interrupt processing that is executed when the crank angle becomes 320°. Furthermore, the engine speed NE10 that is used to compute the latest acquired third partial injection time period TAUp3 is NE10 (the latest parameter value) that is sampled at the crank angle of 320°. Moreover, the engine load KL, the fuel pressure Pf, and the in-cylinder pressure Pc that are used for the same computation are respectively KL, Pf, and Pc (the latest parameter values) that are sampled at the time point closest in terms of time to the time point at which the crank angle becomes 320°. As for the fuel pressure, the fuel pressure that is used for the same computation is the fuel pressure that is sampled at time t8 in FIG. 7B.

As a result of this, when the timer time matches the initiation time of the third partial injection Tp3 that is set in the register 87, as shown in FIG. 7B, the injection command signal is issued with respect to the injection valve 17. Then, the energization of the injection valve 17 is initiated, and the comparison register interrupt processing is executed by the CPU 81. In this interrupt processing, the CPU 81 sets the time (the termination time of the third partial injection) Te for which the third partial injection time period TAUp3 stored in the memory is added to the timer time at the time point in the register 87. In addition, the CPU 81 sets the injection termination flag of the register 87.

As a result of this, when the timer time matches the termination time of the third partial injection Te that is set in the register 87 (that is, when the third partial injection time period TAUp3 elapses), the energization of the injection valve 17 is stopped. As a result of the above, the injection valve 17 is energized only for the third partial injection time period TAUp3 from the time Tp3 at which the crank angle is estimated to match the third partial injection crank angle CAp3. The third partial injection is executed in this way.

In the case where the execution intervals of the computation for injection are shortened to the crank angle intervals of 10° as described above, the parameter values (NE, KL, Pf, and Pc) that are sampled at the time point that is the closest to the initiation time of the each partial injection are used to compute the second and third partial injection time periods TAUp2 and TAUp3 and the required time periods until the initiation of the second and third partial injections ΔTp2 and ΔTp3. Accordingly, the parameter values that are used for this computation are slightly deviated from the parameter values at the time point at which the each partial injection is initiated. For this reason, if the each partial injection is controlled by using these TAUp2 and TAUp3 as well as ΔTp2 and ΔTp3, the further appropriate fuel injection is realized.

Fuel Injection According to the First Embodiment

Based on the above, a specific description will be made on the actuation of the ECU 80 for realizing the fuel injection according to this embodiment.

1. Single-Injection Control

In this embodiment, the actuation of the ECU 80 for realizing the full injection in the single-injection control is the same as the actuation of the ECU 80 that has been described above with reference to FIG. 5A and FIG. 5B. Thus, the actuation will hereinafter be described briefly.

In this embodiment, the CPU 81 sets the each interval as described below when the single-injection control is executed; a predetermined time interval for sampling a particular type (certain one) of the parameter value (in this example, arbitrary one of the engine load (the intake air amount), the fuel pressure, and the in-cylinder pressure): a normal time interval (=a normal sampling interval); a predetermined crank angle interval for sampling the engine speed: the normal crank angle interval (=the normal sampling interval); a predetermined crank angle interval for computing the full injection crank angle and the full injection time period: the normal crank angle interval (=a normal computing interval); a predetermined crank angle interval for defining a crank angle at which the required time period until the initiation of the full injection are computed: the normal crank angle interval (=the normal computing interval); and a predetermined crank angle interval for defining a crank angle at which setting of the initiation time of the full injection and acquisition of the full injection time period are executed: the normal crank angle interval.

In this example, the normal time interval is the certain time interval T1. The normal crank angle interval is the crank angle interval of 30°.

Accordingly, when the single-injection control is executed, similar to the example shown in FIG. 5B, the CPU 81 samples the engine load KL, the fuel pressure Pf, and the in-cylinder pressure Pc at the certain time intervals T1 in the timer interrupt processing. In this example, the CPU 81 sequentially converts analog signals on the output voltages of the airflow meter 34, the fuel pressure sensor 20, and the in-cylinder pressure sensor 21 to digital signals in a constant AD conversion cycle (in this example, 0.4 ms), and stores thus-acquired digital data as data on the intake air amount, the fuel pressure, and the in-cylinder pressure in the memory. Furthermore, each time the intake air amount Ga is sampled, the CPU 81 acquires (samples) the engine load KL on the basis of the sampled intake air amount Ga and the latest engine speed NE30 at the time point.

Thus, when there is no parameter value that should be sampled other than the intake air amount, the fuel pressure, and the in-cylinder pressure, each of the intake air amount, the fuel pressure, and the in-cylinder pressure is sampled at every 1.2 ms (=0.4 ms×3). This 1.2 ms correspond to the above-described normal time interval T1. Noted that this period of 1.2 ms is a shorter time period than a time period that is required for the crank angle to be advanced by 30° when the engine speed NE is 4,000 rpm.

Furthermore, similar to the example shown in FIG. 5A and FIG. 5B, the CPU 81 executes the sampling of the engine speed NE and the computation for injection (the computation of the full injection crank angle and the full injection time period) at the crank angle intervals of 30° in the edge interrupt processing with the crank angle of 0° being the start point.

Moreover, when the CPU 81 determines that the crank angle becomes the full injection crank angle CAf within the time period from the current time point to the time point at which the crank angle becomes the crank angle (the crank angle advanced by 30°) at which the computation for injection based on the next edge interrupt processing is executed, similar to the example shown in FIG. 5A and FIG. 5B, the CPU 81 executes the computation of the required time period until the initiation of the full injection (the additional computation for injection) as well as the setting of the initiation time of the full injection and the acquisition of the time period of the full injection (the injection initiation processing).

Thereafter, similar to the example shown in FIG. 5A and FIG. 5B, the full injection is realized.

In this way, according to this embodiment, when the single-injection control is executed, various types of the parameter values are sampled in a normal sampling mode (a first sampling mode), the computation for injection is executed in the normal computing mode (a first computing mode), and the injection initiation processing is executed in the normal processing mode (a first processing mode).

2. Multi-Injection Control

In this embodiment, when the multi-injection control is executed, the CPU 81 sets each interval as follows; a predetermined time interval for sampling a particular type (certain one) of the parameter value (in this example, arbitrary one of the engine load (the intake air amount), the fuel pressure, and the in-cylinder pressure): a shortened time interval (=a shortened sampling interval); a predetermined crank angle interval for sampling the engine speed: the shortened crank angle interval (=the shortened sampling interval); a predetermined crank angle interval for computing the partial injection crank angle and the partial injection time period: the shortened crank angle interval (=a shortened computing interval); a predetermined crank angle interval for defining a crank angle at which the required time period until the initiation of the partial injection is computed: the shortened crank angle interval (=the shortened computing interval); and a predetermined crank angle interval for defining a crank angle at which setting of the initiation time of the partial injection and acquisition of the partial injection time period are executed: the shortened crank angle interval.

In this example, the shortened time interval is a certain time interval T2 that is shorter than the certain time interval T1, and the shortened crank angle interval is the crank angle interval of 10°.

Accordingly, when the multi-injection control is executed, differing from the example shown in FIG. 7A and FIG. 7B, the CPU 81 samples the engine load KL, the fuel pressure Pf, and the in-cylinder pressure Pc in the timer interrupt processing at the certain time intervals T2. In this example, the CPU 81 sequentially converts analog signals on the output voltages of the airflow meter 34, the fuel pressure sensor 20, and the in-cylinder pressure sensor 21 to digital signals in a constant AD conversion cycle (in this example, 0.13 ms) that is shorter than the above AD conversion cycle in the case where the single-injection control is executed, and stores thus-acquired digital data as data on the intake air amount, the fuel pressure, and the in-cylinder pressure in the memory. Furthermore, each time the intake air amount Ga is sampled, the CPU 81 acquires (samples) the engine load KL the basis of the sampled intake air amount Ga and the latest engine speed NE at the time point.

Thus, when there is no parameter value that should be sampled other than the intake air amount, the fuel pressure, and the in-cylinder pressure, each of the intake air amount, the fuel pressure, and the in-cylinder pressure is sampled at every 0.39 ms (=0.13 ms×3). This 0.39 ms correspond to the above-described shortened time interval T2. Noted that this period of 0.39 ms is a shorter time period than a time period that is required for the crank angle to be advanced by 10° when the engine speed NE is 4,000 rpm.

Furthermore, similar to the example shown in FIG. 7A and FIG. 7B, the CPU 81 executes the sampling of the engine speed NE as well as the computation of the partial injection crank angle and the partial injection time period (the computation for injection) at the crank angle intervals of 10° in the edge interrupt processing with the crank angle of 0° being the start point. Here, the engine load KL, the fuel pressure Pf, and the in-cylinder pressure Pc that are used for the computation of the partial injection crank angle and the partial injection time period in this example are respectively the latest KL, Pf, and Pc at the time point at which the each computation for injection is executed among KL, Pf, and Pc that are sampled at the certain time intervals T2.

Moreover, when the CPU 81 determines that the crank angle becomes any of the partial injection crank angles CAp1 to CAp3 within the time period from the current time point to the time point at which the crank angle becomes the crank angle (that is, the crank angle advanced by 10°) at which the next computation for injection (the computation for injection based on the next edge interrupt processing) is executed, similar to the example shown in FIG. 7A and FIG. 7B, as the additional computation for injection, the CPU 81 executes the computation of the required time period until the initiation of the partial injection (a time period required from the current time point to the initiation of the partial injection) regarding, the partial injection (the partial injection that should be initiated at the partial injection crank angle before the crank angle at which the next computation for injection is executed).

Figure 9A:
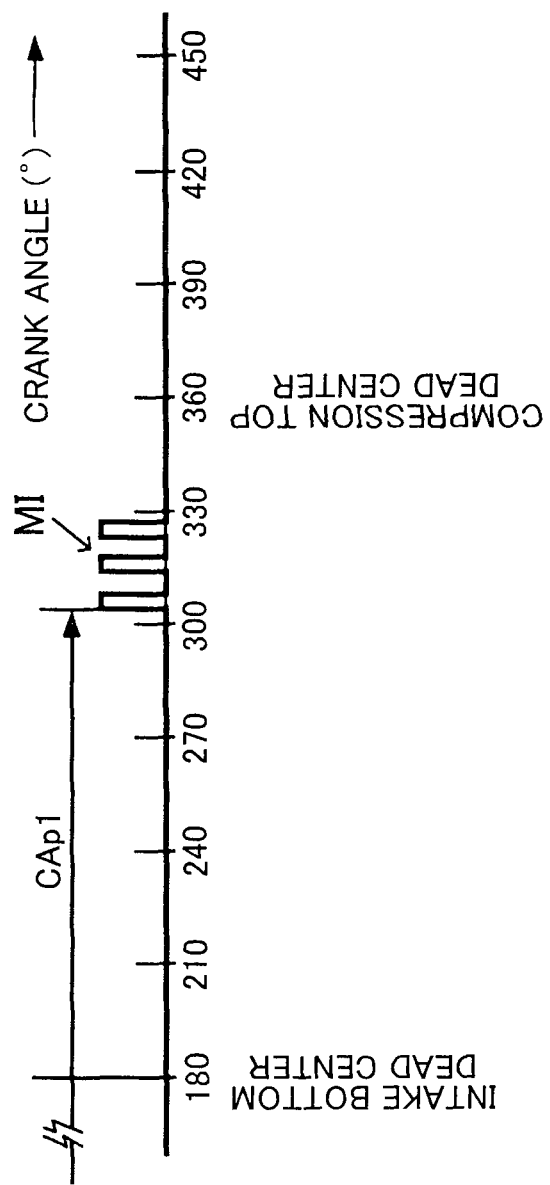
FIG. 9A is the same chart as the FIG. 6A.
Figure 9B:
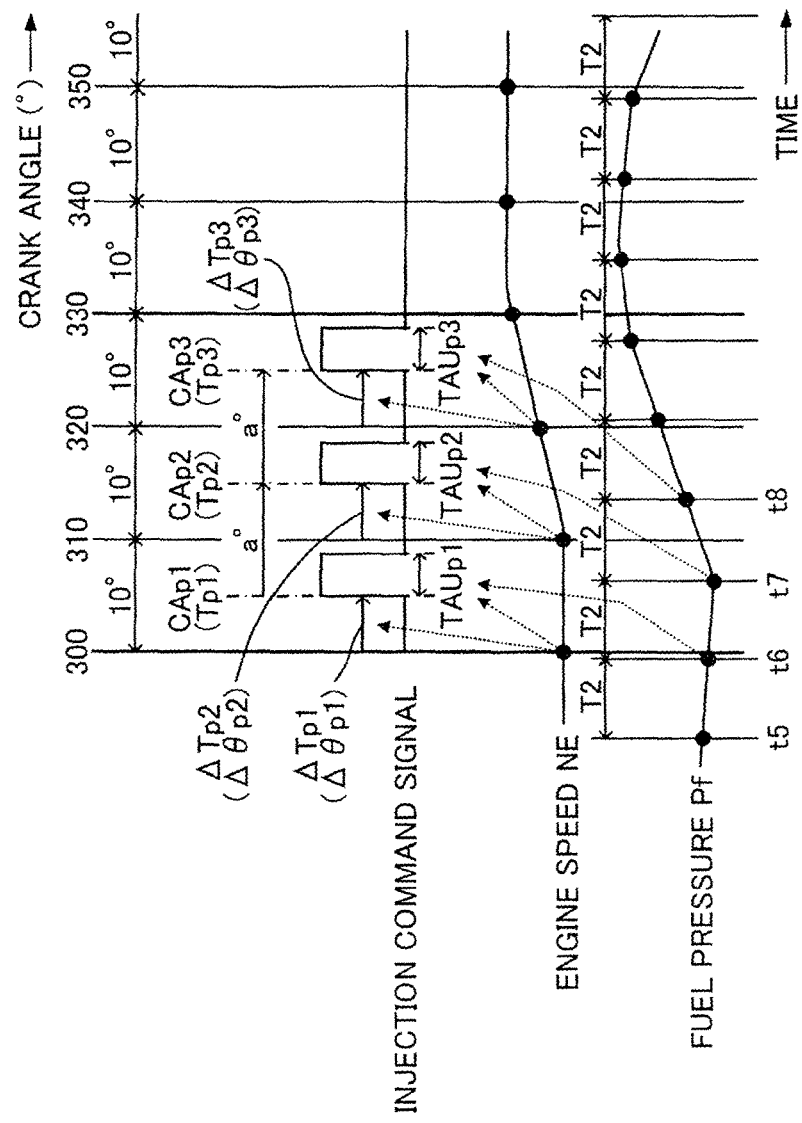
FIG. 9B is a time chart that indicates control values on the partial injection (the fuel injection timing CAp1 to CAp3 of the partial injection and fuel injection time periods TAUp1 to TAUp3 of the partial injection) as well as the engine speed NE and the fuel pressure Pf according to the first embodiment in the case where the multi-injection control is executed.

Furthermore, similar to the example shown in FIG. 7A and FIG. 7B, the CPU 81 sets the initiation time of the partial injection (the time at which the partial injection should be initiated), and acquires the partial injection time period (the fuel injection time period of the partial injection) as computation for the injection initiation. Here, the engine load KL, the fuel pressure Pf, and the in-cylinder pressure Pc that are used to compute the acquired partial injection time period are respectively the latest KL, Pf, and Pc at a time point of the computation of the partial injection time period among KL, Pf, and Pc that are sampled at the certain time intervals T2. As for the fuel pressure Pf, in an example shown in FIG. 9A and FIG. 9B, the fuel pressure Pf that is used for the computation of the acquired partial injection time period is the fuel pressure that is sampled at time t6 in the case where the partial injection that is executed before the crank angle becomes the crank angle at which the next computation for injection is executed is the first partial injection. In the case where the partial injection that is executed before the crank angle becomes the crank angle at which the next computation for injection is executed is the second partial injection, the fuel pressure Pf is the fuel pressure that is sampled at time t7. In the case where the partial injection that is executed before the crank angle becomes the crank angle at which the next computation for injection is executed is the third partial injection, the fuel pressure Pf is the fuel pressure that is sampled at the time t8.

Thereafter, similar to the example shown in FIG. 7A and FIG. 7B, the partial injection is realized.

In this way, according to this embodiment, when the multi-injection control is executed, various types of the parameter values are sampled in a shortened sampling mode, the computation for injection is executed in the shortened computing mode, and the injection initiation processing is executed in the shortened processing mode.

As described above, in this embodiment, when the multi-injection control is executed, each of the predetermined crank angle interval and the predetermined time interval is set to a relatively short interval. Accordingly, the control values that are used for the partial injection (the partial injection crank angles CAp1 to CAp3, the partial injection time periods TAUp1 to TAUp3, and the required time period until the initiation of the partial injection ΔTp1 to ΔTp3) are the control values that are computed at the each initiation time of the partial injection by using the parameter values (NE, KL, Pf, and Pc), each of which is acquired at the closest time point. Thus, even when any of the parameter value fluctuates during the execution of the multi-injection control, the change is highly likely to be reflected to the computation of the control value that is used for the partial injection. Therefore, according to this embodiment, the further appropriate fuel injection is realized in the each partial injection.

Furthermore, when each of the predetermined crank angle interval and the predetermined time interval is constantly set as the short interval, processing loads on the sampling of the parameter values, on the computation for injection, and on the injection initiation processing increase by a degree of shortened. In addition, in general, a computing device such as the CPU of the internal combustion engine executes computation of control values that are required for the engine control other than the fuel injection and sampling of parameter values that are used for the computation, in addition to the sampling of the parameter values that are used for the computation for injection, the computation for injection, and the injection initiation processing described above. For this reason, when the predetermined crank angle interval and the predetermined time interval, at each of which the parameter values used for the computation for injection are sampled, the predetermined crank angle interval at which the computation for injection is executed, and the predetermined crank angle interval for defining the crank angle at which the injection initiation processing is executed are each set as the constantly short interval, accuracy of the engine control other than the fuel injection may unnecessarily be reduced. Needless to say, the reduction in accuracy of the engine control, just as described, can be avoided by using the high-performance computing device. However, this results in an increased cost of the ECU.

On the other hand, as described above, in the case where the single-injection control is executed, even when the parameter value is changed due to an influence of the fuel injection in the single-injection control or the like, there is no fuel injection to which the change should immediately be reflected. Furthermore, since an amount of the fuel that is injected by the partial injection is very small, this amount of the fuel is significantly influenced by the change of the parameter value. Meanwhile, an amount of the fuel that is injected by the full injection is relatively larger than the amount of the fuel injected by the partial injection. Thus, the amount of the fuel that is injected by the full injection is not significantly influenced by the change of the parameter value. Therefore, in the case where the single-injection control is executed, even when each of the predetermined crank angle interval and the predetermined time interval is the relatively long interval, the appropriate fuel injection is sufficiently realized.

From the points described above, in this embodiment, when the single-injection control is executed, each of the predetermined crank angle interval and the predetermined time interval is set to a normal interval that is relatively long. Therefore, in the single-injection control, the appropriate fuel injection is realized, and the reduction in accuracy of the engine control other than the fuel injection is avoided.

3. Actual Actuation

Figure 10:
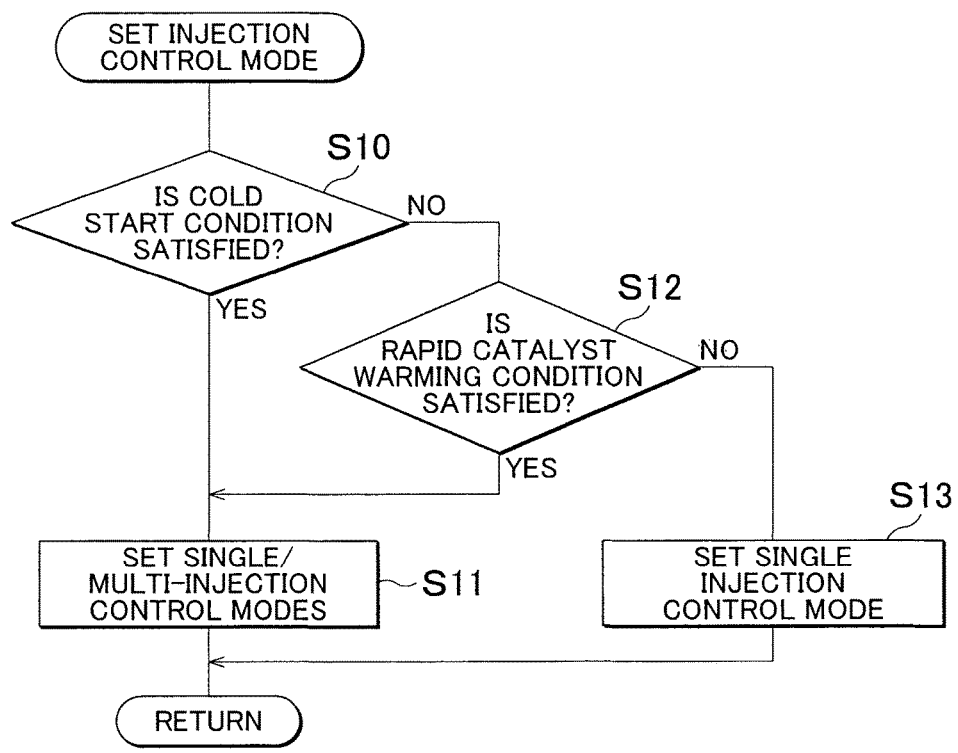
FIG. 10 shows a flow of setting an injection control mode in accordance with the first embodiment.

Next, a further specific description will be made on setting of an injection control mode according to this embodiment by using a flow in FIG. 10. The flow in FIG. 10 is initiated in the interrupt processing at the predetermined time intervals. Once this flow is initiated, first, it is determined in step S10 whether the cold start condition is satisfied. If the cold start condition is satisfied, the flow proceeds to step S11. On the contrary, if the cold start condition is not satisfied, the flow proceeds to step S12.

In step S12, it is determined whether a catalyst rapid warming condition is satisfied. If the catalyst rapid warming condition is satisfied, the flow proceeds to step S11. On the contrary, if the catalyst rapid warming condition is not satisfied, the flow proceeds to step S13.

In step S11, as the injection control mode, a mode for executing the single-injection control and the multi-injection control in the one engine cycle is set, and the flow is terminated. In this case, as shown in FIG. 3, in the one engine cycle, the single-injection control is executed during the intake stroke, and the multi-injection control is executed during the compression stroke.

In step S13, as the injection control mode, a mode for executing only the single-injection control in the one engine cycle is set, and the flow is terminated. In this case, as shown in FIG. 4, in the one engine cycle, the single-injection control is executed during the intake stroke.

Figure 11A:
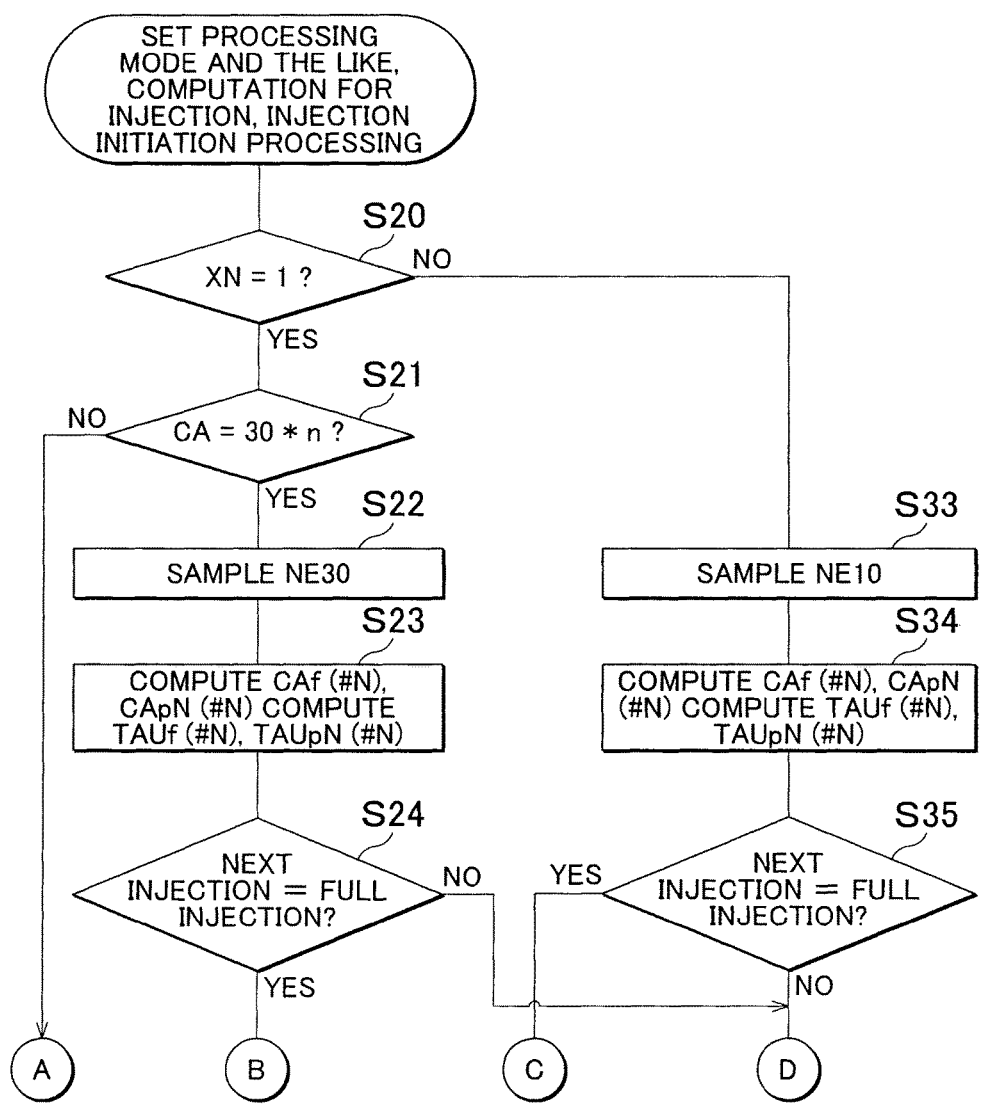
FIGS. 11A and 11B shows a flow of setting a computing mode, a sampling mode, and a processing mode in accordance with the first embodiment and executing computation for injection and injection initiation processing.
Figure 11B:
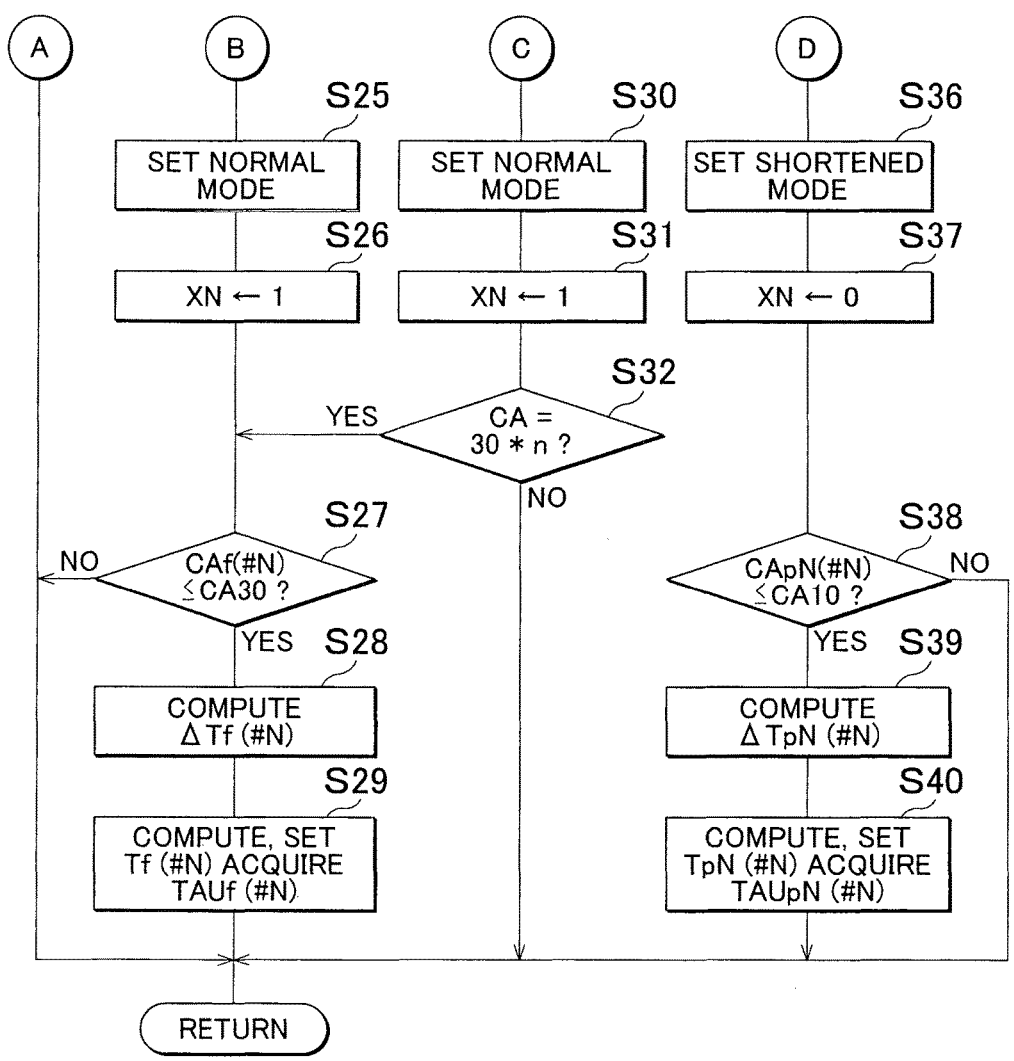
Figure 12:
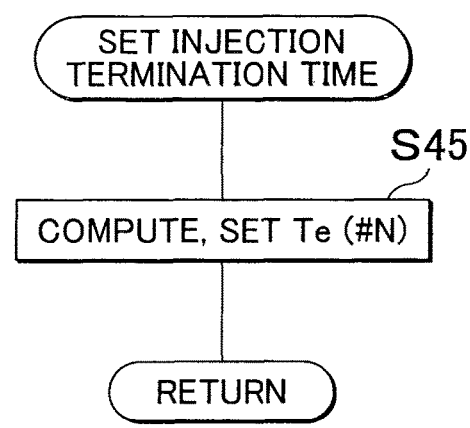
FIG. 12 shows a flow of setting termination time of the fuel injection in accordance with the first embodiment.

Next, a further specific description will be made on setting of the sampling modes, the computing modes, and the processing modes as well as the computation for injection and the injection initiation processing according to this embodiment by using a flow in FIG. 11A, 11B and FIG. 12. The flow in FIG. 11A, 11B is initiated in the interrupt processing at, the predetermined crank angle interval (in this example, the crank angle interval of 10°). The flow in FIG. 12 is initiated in the comparison register interrupt processing when the each fuel injection is initiated:

Once the flow in FIG. 11A, 11B is initiated, first, it is determined in step S20 whether a computation interval flag XN is set to "1" (XN=1). This flag XN is a flag that is set when the next fuel injection in all of the cylinders is the full injection, that is, when the predetermined crank angle interval and the predetermined time interval are respectively set to the normal crank angle interval and the normal time interval, and reset when the next fuel injection is the partial injection, that is, when the predetermined crank angle interval and the predetermined time interval are respectively set to the shortened crank angle interval and the shortened time interval. In step S20, if XN=1, the flow proceeds to step S21. On the contrary, when XN=1 is not satisfied, the flow proceeds to step S33.

In step S21, it is determined whether a current crank angle CA is a crank angle 30*n (n is an integer from 1 to 24) (CA=30*n) at the crank angle intervals of 30° (the normal crank angle intervals) with the crank angle of 0° being the start point. If CA=30*n, the flow proceeds to step S22. On the contrary, if CA=30*n is not satisfied, the flow is terminated. In other words, steps S22 and onward are performed at the crank angle intervals of 30°.

In step S22, the engine speed NE30 is sampled. Next, in step S23, the full injection crank angle CAf (#N) and each of first to third partial injection crank angles CApN (#N) in the each cylinder are computed on the basis of the latest engine speed (the engine speed that is sampled in step S22) NE30 and the latest engine load KL. In addition, the full injection time period TAUf (#N) and first to third partial injection time periods TAUpN (#N) in the each cylinder are computed on the basis of the latest engine speed (the engine speed that is sampled in step S22) NE30, the latest engine load KL, the latest fuel pressure Pf, and the latest in-cylinder pressure Pc.

However, if the single-injection control mode is set in step S13 in FIG. 10 and only the single-injection control is executed, only the full injection time period TAUf (#N) in the each cylinder is computed in step S23 in FIG. 11A.

Noted that #N represents the first cylinder to the fourth cylinder, CAf (#N) represents the full injection crank angle in each of the first cylinder to the fourth cylinder, CApN (#N) represents the first to third partial injection crank angles in each of the first cylinder to the fourth cylinder, TAUf (#N) represents the full injection time period in each of the first cylinder to the fourth cylinder, and TAUpN (#N) represents the first to third partial injection time periods in each of the first cylinder to the fourth cylinder.

Next, in step S24, it is determined whether the next fuel injection in all of the cylinders is the full injection. If the next fuel injection is the full injection, the flow proceeds to step S25. On the contrary, if the next fuel injection is not the full injection, that is, if the next fuel injection is the partial injection, the flow proceeds to step S36.

In step S25, the sampling mode, the computing mode, and the processing mode are respectively set to the normal sampling mode, the normal computing mode, and the normal processing mode. In other words, the predetermined crank angle interval and the predetermined time interval are respectively set to the normal crank angle interval (the crank angle intervals of 30°) and the normal time interval (T1). Next, in step S26, the computation interval flag XN is set (XN←1).

Then, in step S27, it is determined whether any of the computed full injection crank angles CAf (#N) is a crank angle (CAf (#N)≤CA30) before a crank angle CA30 at which the current crank angle is advanced by 30°. If none of the angles CAf (#N) is the crank angle before the angle CA30, the flow is terminated. On the contrary, if any of the angles CAf (#N) is the crank angle before the angle CA30, the flow proceeds to step S28. Hereinafter, the full injection crank angle that is determined to be the crank angle before the angle CA30 is referred to as a subject full injection crank angle, the full injection that should be initiated at the subject full injection crank angle is referred to as subject full injection, and the cylinder in which the subject full injection should be initiated is referred to as a subject cylinder.

In step S28, on the basis of the latest engine speed NE, a time period (a required time period until initiation of the subject full injection) ΔTf (#N) that is required for the crank angle to become the subject full injection crank angle CAf (#N) from current time Tnow is computed.

Then, in step S29, time (initiation time of the subject full injection) Tf (#N) for which the required time period ΔTf (#N) is added to the current time Tnow is computed (Tf (#N)=Tnow+ΔTf (#N)). This time Tf (#N) is set in the register 87 that corresponds to the injection valve 17 of the subject cylinder. Furthermore, the injection initiation flag of the register 87 is set. Moreover, the latest full injection time period that corresponds to the subject full injection (that is, the full injection time period that is computed in step S23) TAUf (#N) is acquired. This TAUf (#N) is stored in the memory, and the flow is terminated. In this way, when the time indicated by the timer 85 matches the initiation time of the subject full injection Tf (#N) that is set in the register 87, the energization of the injection valve 17 in the subject cylinder is executed by the register 87. Then, the full injection is initiated in the subject cylinder.

Then, when the full injection is initiated, the flow in FIG. 12 is initiated in the comparison register interrupt processing. In step S45, the time (the termination time of the subject full injection) Te (#N) for which the full injection time period TAUf (#N), which is stored in the memory in step S29 in FIG. 11B, is added to the initiation time of the subject full injection Tf (#N) is computed (Te (#N)=Tf (#N)+TAUf (#N). This time Te (#N) is set in the register 87 that corresponds to the injection valve 17 of the subject cylinder. Furthermore, the injection termination flag of the register 87 is set, and the flow is terminated. Then, when the time indicated by the timer 85 matches the subject termination time of the full injection Te (#N) that is set in the register 87, the energization of the injection valve 17 is stopped by the register 87. In this way, the full injection in the subject cylinder is terminated.

In step S33, the engine speed NE10 is sampled. Next, in step S34, the full injection crank angle CAf (#N) and the first to third partial injection crank angles CApN (#N) in the each cylinder are computed on the basis of the latest engine speed (the engine speed that is sampled in step S33) NE10 and the latest engine load KL. In addition, the full injection time period TAUf (#N) and the first to third partial injection time periods TAUpN (#N) in the each cylinder are computed on the basis of the latest engine speed (the engine speed that is sampled in step S33) NE10, the latest engine load KL, the latest fuel pressure Pf, and the latest in-cylinder pressure Pc.

However, if the single-injection control mode is set in step S13 in FIG. 10 and only the single-injection control is executed, only the full injection time period TAUf (#N) in the each cylinder is computed in step S34 in FIG. 11A.

Next, in step. S35, it is determined whether the next fuel injection in all of the cylinders is the full injection. If the next fuel injection is the full injection, the flow proceeds to step S30. On the contrary, if the next fuel injection is not the full injection, that is, if the next fuel injection is the partial injection, the flow proceeds to step S36.

In step S36, the sampling mode, the computing mode, and the processing mode are respectively set to the shortened sampling mode, the shortened computing mode, and the shortened processing mode. In other words, the predetermined crank angle interval and the predetermined time interval are respectively set to the shortened crank angle interval (the crank angle interval of 10°) and the shortened time interval (T2). Next, in step S37, the computation interval flag. XN is reset (XN←0).

Next, in step S38, it is determined whether any of the computed first to third partial injection crank angles CApN (#N) is the crank angle (CApN (#N)≤CA10) before a crank angle CA10 at which the current crank angle is advanced by 10°. If none of the angle CApN (#N) is the crank angle before the angle CA10, the flow is terminated. On the contrary, if any of the angle CApN (#N) is the crank angle before the angle CA10, the flow proceeds to step S39. Hereinafter, the partial injection crank angle that is determined to be the crank angle before the angle CA10 is referred to as the subject partial injection crank angle, the partial injection that should be initiated at the subject partial injection crank angle is referred to as subject partial injection, and the cylinder in which the subject partial injection should be initiated is referred to as the subject cylinder.

In step S39, on the basis of the latest engine speed NE, a time period (a required time period until initiation of the subject partial injection) ΔTpN (#N) that is required for the crank angle to become the subject partial injection crank angle CApN (#N) from the current time Tnow is computed.

Next, in step S40, time (initiation time of the subject partial injection) TpN (#N) for which the required time period ΔTpN (#N) is added to the current time Tnow is computed (TpN (#N)=Tnow+ΔTpN(#N)). This time TpN (#N) is set in the register 87 that corresponds to the injection valve 17 of the subject cylinder. Furthermore, the injection initiation flag of the register 87 is set, and the latest partial injection time period that corresponds to the subject partial injection (that is, the partial injection time period that is computed in step S34) TAUpN (#N) is acquired. This TAUpN (#N) is stored in the memory, and the flow is terminated. In this way, when the time indicated by the timer 85 matches the initiation time of the subject partial injection TpN (#N) that is set in the register 87, the energization of the injection valve 17 in the subject cylinder is executed by the register 87. Then, the partial injection is initiated in the subject cylinder.

Then, when the partial injection is initiated, the flow in the FIG. 12 is initiated in the comparison register interrupt processing. In step S45, the time (the termination time of the partial injection) Te (#N) for which the partial injection time period TAUpN (#N), which is stored in the memory in step S40 in FIG. 11B, is added to the initiation time of the subject partial injection TpN (#N) is computed (Te (#N)=TpN (#N)+TAUpN (#N)). This time Te (#N) is set in the register 87 that corresponds to the injection valve 17 of the subject cylinder. Furthermore, the injection termination flag of the register 87 is set, and the flow is terminated. Then, when the time indicated by the timer 85 matches the subject termination time of the partial injection Te (#N) that is set in the register 87, the energization of the injection valve 17 is stopped by the register 87. In this way, the partial injection in the subject cylinder is terminated.

In step S30, the sampling mode, the computing mode, the processing mode are respectively set to the normal sampling mode, the normal computing mode, and the normal processing mode. In other words, the predetermined crank angle interval and the predetermined time interval are respectively set to the normal crank angle interval (the crank angle interval of 30°) and the normal time interval (T1). Next, in step S31, the computation interval flag XN is set (XN←1). Then, in step S32, it is determined whether the current crank angle CA is the crank angle 30*n (n is the integer from 1 to 24) (CA=30*n) at the crank angle intervals of 30° (the normal crank angle intervals) with the crank angle 0° being the start point. If CA=30*n, the flow proceeds to step S27. On the contrary, if CA=30*n is not satisfied, the flow is terminated.

Second Embodiment

By the way, as shown in FIG. 3, in the case where both of the single-injection control and the multi-injection control are executed in the one engine cycle in the each cylinder, immediately after the single-injection control is executed during the intake stroke in the first cylinder #1, the multi-injection control is executed during the compression stroke in the second cylinder #2. Furthermore, immediately after the multi-injection control during the compression stroke in the second cylinder #2, the single-injection control is executed during the intake stroke in the fourth cylinder #4. Moreover, immediately after the single-injection control during the intake stroke in the fourth cylinder #4, the multi-injection control is executed during the compression stroke in the first cylinder #1. In other words, the single-injection control and the multi-injection control are alternately executed at extremely short time intervals.

In this case, according to the first embodiment, the CPU 81 needs to execute the sampling of various types of the parameter values, the computation of various types of the control values (the computation for injection), and the injection initiation processing while frequently switching the predetermined crank angle interval and the predetermined time interval, respectively, between the normal crank angle interval and the normal time interval and between the shortened crank angle interval and the shortened time interval. However, this causes an excess increase of the processing load on the sampling of the parameter values, the computation for injection, and the injection initiation processing, and also complicates a processing program on the sampling of the parameter values, the computation for injection, and the injection initiation processing. In view of this, in the second embodiment, the CPU 81 sets the each interval as follows.

1. Single-Injection Control

In other words, when only the single-injection control is executed in the one engine cycle, the CPU 81 sets the each interval as follows; the predetermined time interval for sampling a particular type (certain one) of the parameter value (in this example, arbitrary one of the engine load (the intake air amount), the fuel pressure, and the in-cylinder pressure): the normal time interval (=the normal sampling interval); the predetermined crank angle interval for sampling the engine speed: the normal crank angle interval (=the normal sampling interval); the predetermined crank angle interval for computing the full injection crank angle and the full injection time period: the normal crank angle interval (=the normal computing interval); the predetermined crank angle interval for defining the crank angle at which the required time period until the initiation of the full injection is computed: the normal crank angle interval (=the normal computing interval); and a predetermined crank angle interval for defining the crank angle at which the setting of the initiation time of the full injection and the acquisition of the full injection time period are executed: the normal crank angle interval.

In this case, as in the first embodiment, the normal time interval is the certain time interval T1. The normal crank angle interval is the crank angle interval of 30°.

In other words, as in the case where the full injection of the single-injection control is realized in the first embodiment, the ECU 80 realizes the full injection of the single-injection control.

2. Multi-Injection Control

Furthermore, when only the multi-injection control is executed in one engine cycle, the CPU 81 sets the each interval as follows; the predetermined time interval for sampling a particular type (certain one) of the parameter value (in this example, arbitrary one of the engine load (the intake air amount), the fuel pressure, and the in-cylinder pressure): a shortened time interval (=the shortened sampling interval); the predetermined crank angle interval for sampling the engine speed: the shortened crank angle interval (=the shortened sampling interval); the predetermined crank angle interval for computing the partial injection crank angle and the partial injection time period: the shortened crank angle interval (=the shortened computing interval); the predetermined crank angle interval for defining the crank angle at which the required time period until the initiation of the partial injection is computed: the shortened crank angle interval (=the shortened computing interval); and the predetermined crank angle interval for defining the crank angle at which the setting of the initiation time of the partial injection and the acquisition of the partial injection time period are executed: the shortened crank angle interval.

In this case, as in the first embodiment, the shortened time interval is the certain time interval T2 that is shorter than the certain time interval T1. The shortened crank angle interval is the crank angle interval of 10°.

In other words, as in the case where the each partial injection of the multi-injection control is realized in the first embodiment, the ECU 80 realizes the each partial injection of the multi-injection control.

3. Single-Injection Control and Multi-Injection Control

In addition, when both of the single-injection control and the multi-injection control are executed in one engine cycle, as in the case where only the multi-injection control is executed in one engine cycle in the above 2., the CPU 81 sets the each interval (the predetermined time interval and the predetermined crank angle interval). In other words, as in the case where the each partial injection of the multi-injection control is realized in the first embodiment, the ECU 80 realizes the full injection of the single-injection control and the each partial injection of the multi-injection control.

Next, a further specific description will be made on the actuation of the ECU 80 according to the second embodiment in the case where both of the single-injection control and the multi-injection control are executed in one engine cycle with reference to FIG. 13A and FIG. 13B.

In this case, the CPU 81 samples the engine load KL, the fuel pressure Pf, and the in-cylinder pressure Pc in the timer interrupt processing at the shortened time intervals T2. In this case, the intake air amount Ga is sampled on the basis of the output voltage of the airflow meter 34 at the shortened time intervals T2. Each time the intake air amount Ga is sampled, the engine load KL is computed on the basis of the sampled intake air amount Ga, and the latest engine speed NE10 at the time point among the engine speeds NE10 that are sampled at the crank angle interval of 10°.

Furthermore, the CPU 81 executes the sampling of the engine speed NE and the computation for injection in the edge interrupt processing at the crank angle interval of 10° with the crank angle 0° being the start point. In this case, the computation for injection means to calculate the control values (in this example, the full injection crank angle, the full injection time period, the first to third partial injection crank angles, and the first to third partial injection time periods) that are required for the full injection and the partial injection on the basis of various types of the parameter values (in this example, the engine speed NE10, the engine load KL, the fuel pressure Pf, and the in-cylinder pressure Pc). In addition, in this case, as described above, the engine speed NE to be sampled is the engine speed NE10 that is computed from the time period required for the crankshaft 25 to rotate by 10°.

The computation for injection in this case will be described specifically. In the each computation for injection that is executed at the crank angle interval of 10°, the CPU 81 determines (computes) the full injection crank angle (the crank angle at which the full injection should be initiated) CAf and the first partial injection crank angle (the crank angle at which the first partial injection should be initiated) CAp1 from the lookup tables shown in FIG. 8A and FIG. 8B on the basis of the latest engine speed. NE10 and the latest engine load KL at the time point (that is, the latest parameter values). In addition, the CPU 81 computes the full injection time period (the fuel injection time period for realizing the full injection) TAUf and the first partial injection time period (the fuel injection time period for realizing the first partial injection) TAUp1 on the basis of the latest engine speed NE10, the latest engine load KL, the latest fuel pressure Pf, and the latest in-cylinder pressure Pc (that is, the latest parameter values) at the time point.

Furthermore, the CPU 81 computes the second partial injection crank angle (the crank angle at which the second partial injection should be initiated) CAp2 by adding the predetermined crank angle a° to the computed first partial injection crank angle CAp1. Then, CPU 81 computes the third partial injection crank angle (the crank angle at which the third partial injection should be initiated) CAp3 by adding the predetermined crank angle a° to this second partial injection crank angle. In addition, the CPU 81 computes the second and third partial, injection time periods (the fuel injection time periods for realizing the second and third partial injections) TAUp2 and TAUp3 on the basis of the latest engine speed NE10, the latest engine load KL, the latest fuel pressure Pf, and the latest in-cylinder pressure Pc at the time point.

In this example, the latest engine speed NE10 that is used for the each computation for injection is NE10 that is sampled at the crank angle at which the each computation for injection is executed. The latest engine load KL, the latest fuel pressure Pf, and the latest in-cylinder pressure Pc that are used for the each computation for injection are respectively KL, Pf, and Pc that are sampled at the time point that is the closest in terms of time to the time point at which the each computation for injection is executed.

Next, the CPU 81 determines whether the crank angle becomes any of the full injection crank angle CAf and the partial injection crank angle CAp1 to CAp3 within a time period from the current time point to the time point at which the crank angle becomes a crank angle at which the next computation for injection (the computation for injection based on the next edge interrupt processing) is executed (that is, the crank angle that is advanced by 10°). If the crank angle does not become any of the injection crank angle CAf and CAp1 to CAp3 within the period from the current time point to the time point at which the crank angle becomes a crank angle at which the next computation for injection is executed, the CPU 81 does not execute the additional computation for injection and processing (the injection initiation processing) for initiating the energization of the injection valve 17.

In this case, the additional computation for injection means to calculate the time period (the required time period until the initiation of injection) that is required for the crank angle to become any of the subject injection crank angles CAf and CAp1 to CAp3 from the current time point (the injection crank angle before the crank angle at which the next computation for injection is executed).

Furthermore, the injection initiation processing means to set the time (the initiation time of the fuel injection) at which the crank angle becomes the subject injection crank angle (the injection crank angle before the crank angle at which the next computation for injection is executed) in the register 87, and to acquire the latest fuel injection time period at the time point (the fuel injection time period for realizing the fuel injection that should be initiated at the subject injection crank angle).

Figure 13A:
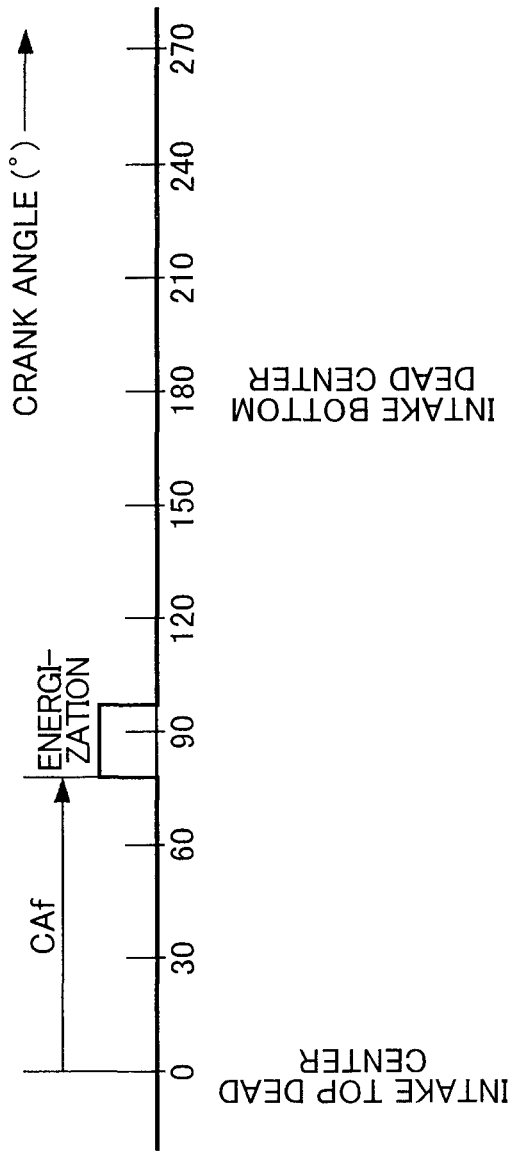
FIG. 13A is the same chart as the FIG. 5A.
Figure 13B:
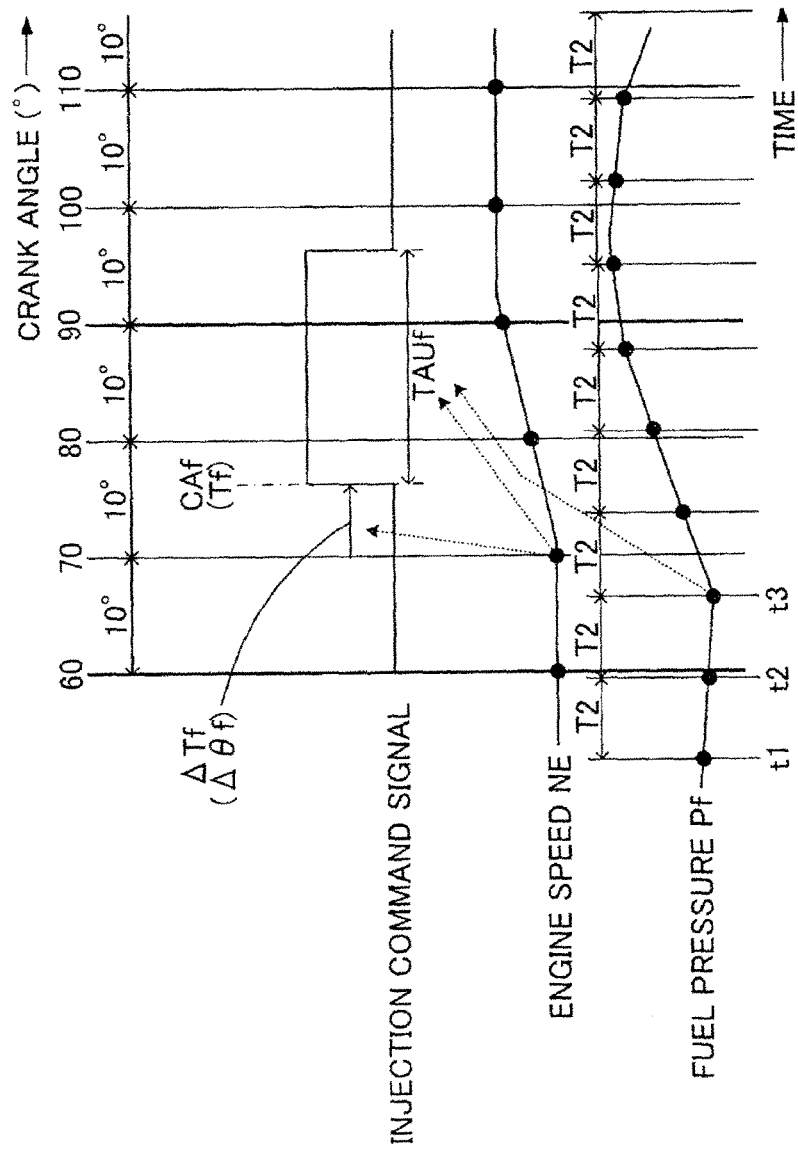
FIG. 13B is a time chart that indicates control values on the full injection (fuel injection timing CAf of the full injection and a fuel injection time period TAUf of the full injection) as well as the engine speed NE and the fuel pressure Pf according to a second embodiment in the case where the single-injection control and the multi-injection control are executed in one engine cycle.

In the example shown in FIG. 13A and FIG. 13B, the crank angle becomes the full injection crank angle CAf between 70° and 80°. Accordingly, in the computation for injection based on the edge interrupt processing that is executed when the crank angle becomes 70°, the CPU 81 determines that the crank angle becomes the full injection crank angle CAf within the time period from the current time point to the time point at which the crank angle becomes the crank angle at which the next computation for injection is executed (that is, the crank angle 80°). Next, the CPU 81 executes the additional computation for injection, which is followed by the computation for the injection initiation.

In the additional computation for injection, on the basis of the latest engine speed NE10 at the time point, the CPU 81 converts (computes) a difference Δθf between the full injection crank angle CAf (the latest control value) and the crank angle of 70° to the time period (the required time period until the initiation of the full injection) ΔTf that is required for the crank angle to become the full injection crank angle CAf from the current time point (the time point at which the crank angle becomes 70°). In this example, the latest engine speed NE10 that is used for this conversion is NE10 that is sampled at the crank angle of 70°.

In the following injection initiation processing, the CPU 81 sets the time (the initiation time of the full injection) Tf, for which the required time period ΔTf (the latest control value) is added to the current time indicated by the timer 85, in the register 87 that corresponds to the injection valve 17 in which the full injection should be executed. In addition, the CPU 81 sets the injection initiation flag of the register 87. Furthermore, the CPU 81 acquires the latest full injection time period TAUf (the latest control value) at the time point, and stores it in the memory.

In this example, the latest acquired full injection time period TAUf is TAUf that is computed in the computation for injection based on the edge interrupt processing that is executed when the crank angle becomes 70°. Furthermore, the engine speed NE10 that is used to compute the latest acquired full injection time period TAUf is NE10 (the latest parameter value) that is sampled at the crank angle of 70°. In addition, the engine load KL, the fuel pressure Pf, and the in-cylinder pressure Pc that are used for the same computation are respectively KL, Pf, and Pc (the latest parameter values) that are sampled at the time point that is the closest in terms of time to the time point at which the crank angle is 70°. As for the fuel pressure, the fuel pressure that is used for the same computation is the fuel pressure that is sampled at time t3 in FIG. 13B.

As a result of this, when the time indicated by the timer 85 (the timer time) matches the initiation time of the full injection Tf that is set in the register 87, as shown in FIG. 13B, the injection command signal is issued with respect to the injection valve 17. Then, the energization of the injection valve 17 is initiated, and the comparison register interrupt processing is executed by the CPU 81. In this interrupt processing, the CPU 81 sets the time (the termination time of the full injection) Te, for which the full injection time period TAUf stored in the memory is added to the timer time at the time point, in the register 87. In addition, the CPU 81 sets the injection termination flag of the register 87.

As a result of this, when the timer time matches the termination time of the full injection Te that is set in the register 87 (that is, when the full injection time period TAUf elapses), the energization of the injection valve 17 is stopped. As a result of the above, the injection valve 17 is energized only for the full injection time period TAUf from the time Tf at which the crank angle is estimated to match the full injection crank angle CAf. The full injection is executed in this way.

When the crank angle becomes any of the partial injection crank angles CAp1 to CAp3 within the time period from the current time point to the time point at which the crank angle becomes the crank angle at which the next computation for injection is executed, the CPU 81 executes the additional computation for injection and the injection initiation processing for realizing the partial injection that should be initiated at the partial injection crank angle. These additional computation for injection and injection initiation processing are the same as the additional computation for injection and the injection initiation processing for realizing the partial injection according to the first embodiment that are described above with reference to FIG. 9A and FIG. 9B. Thus, the description thereof will not be repeated.

As described above, according to the second embodiment, when only the single-injection control is executed in one engine cycle, the predetermined crank angle interval and the predetermined time interval are respectively set to the normal crank, angle intervals and the normal time interval. On the contrary, when both of the single-injection control and the multi-injection control are executed in one engine cycle, the predetermined crank angle interval and the predetermined time interval are respectively set to the shortened crank angle intervals and the shortened time interval, also for the single-injection control. In this way, not only when the multi-injection control is executed, but also when the single-injection control is executed, the computation for injection and the sampling of the engine speed are executed at the shortened crank angle intervals. The engine load, the fuel pressure, and the in-cylinder pressure are sampled at the shortened time interval. The injection initiation processing is executed at the crank angles of the shortened crank angle intervals.

As described above, in the second embodiment, in the case where both of the single-injection control and the multi-injection control are executed in one engine cycle, each of the predetermined crank angle interval and the predetermined time interval is set as a relatively short time interval also when the single-injection control is executed. For this reason, the predetermined crank angle interval and the predetermined time interval cannot be switched frequently. Thus, it is possible to avoid the excess increase of the processing load on the sampling of the parameter values, the computation for injection, and the injection initiation processing, and also to avoid complication of the processing program on the sampling of the parameter values, the computation for injection, and the injection initiation processing.

In addition, in the second embodiment, compared to the case where only the single-injection control is executed in one engine cycle, when both of the single-injection control and the multi-injection control are executed in one engine cycle, the parameter values at the time point that is the closest to the initiation time of the full injection are used to compute the control values on the full injection (the full injection crank angle CAf, the full injection time period TAUf, and the required time period until the initiation of the full injection ΔTf). Thus, the further appropriate fuel injection is realized in the full injection.

4. Actual Actuation

Figure 14:
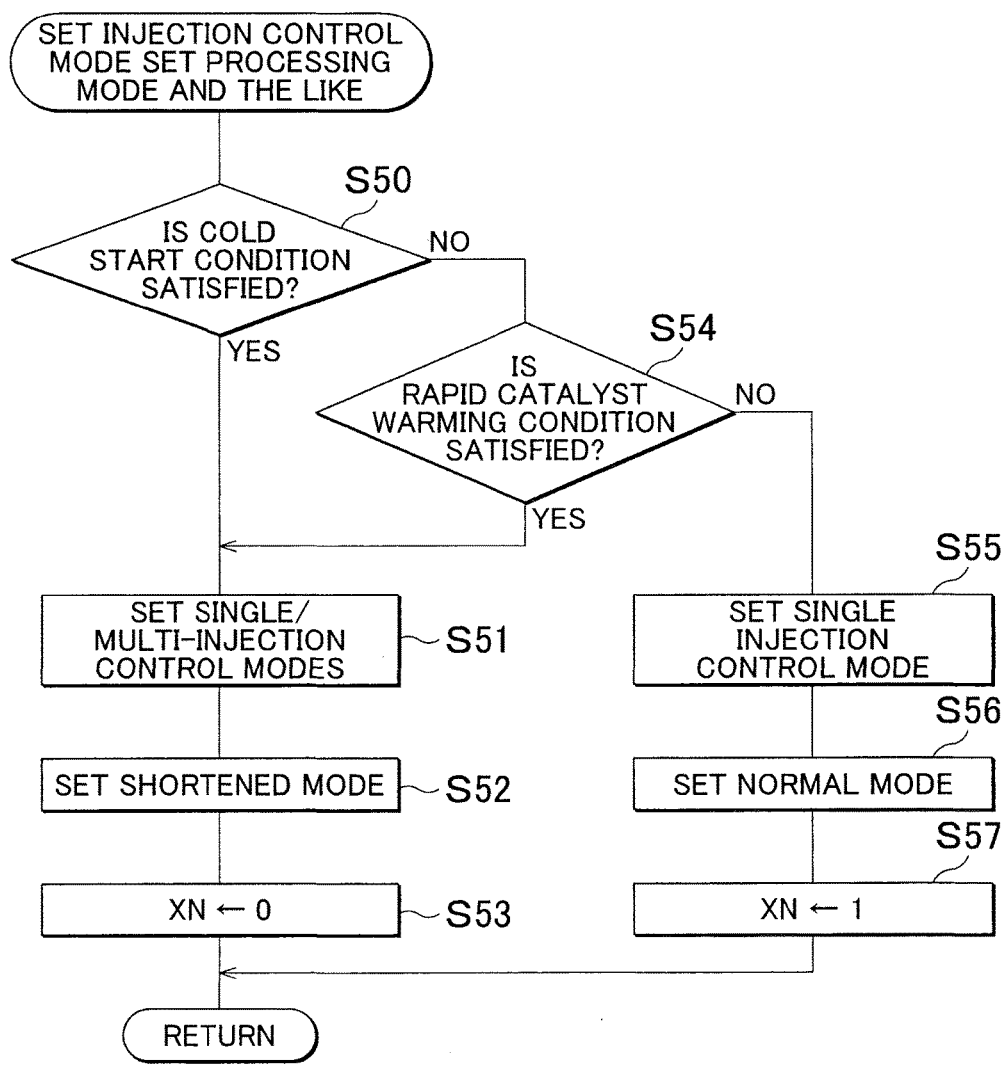
FIG. 14 shows a flow of setting an injection control mode in accordance with the second embodiment and setting the computing mode, the sampling mode, and the processing mode.

Next, a further specific description will be made on setting of the injection control mode as well as setting of the sampling mode, the computing mode, and the processing mode according to the second embodiment by using a flow in FIG. 14. The flow in FIG. 14 is initiated in the interrupt processing at the predetermined time interval. Once this flow is initiated, first, it is determined in step S50 whether the cold start condition is satisfied. If the cold start condition is satisfied, the flow proceeds to step S51. On the contrary, if the cold start condition is not satisfied, the flow proceeds to step S54.

It is determined in step S54 whether the catalyst rapid warming condition is satisfied. If the catalyst rapid warming condition is satisfied, the flow proceeds to step S51. On the contrary, if the catalyst rapid warming condition is not satisfied, the flow proceeds to step S55.

In step S51, a mode in which both of the single-injection control and the multi-injection control are executed in one engine cycle is set as the injection control mode. In this case, as shown in FIG. 3, the single-injection control is executed during the intake stroke, and the multi-injection control is executed during the compression stroke in one engine cycle. Next, in step S52, the sampling mode, the computing mode, and the processing mode are respectively set to the shortened sampling mode, the shortened computing mode, and the shortened processing mode. In other words, the predetermined crank angle interval and the predetermined time interval are respectively set to the shortened crank angle interval (the crank angle interval of 10°) and the shortened time interval (T2). Next, in step S53, the computation interval flag XN is reset (XN←0), and the flow is terminated. This flag XN is a flag that is reset when the single-injection control and the multi-injection control are executed in one engine cycle and that is set when only the single-injection control is executed in one engine cycle.

In step S55, a mode in which only the single-injection control is executed in one engine cycle is set as the injection control mode. In this case, as shown in FIG. 4, the single-injection control is executed during the intake stroke in one engine cycle. Next, in step S56, the sampling mode, the computing mode, and the processing mode are respectively set to the normal sampling mode, the normal computing mode, and the normal processing mode. In other words, the predetermined crank angle interval and the predetermined time interval are respectively set to the normal crank angle interval (the crank angle interval of 30°) and the normal time interval (T1). Next, in step S57, the computation interval flag XN is set (XN←1), and the flow is terminated.

Figure 15:
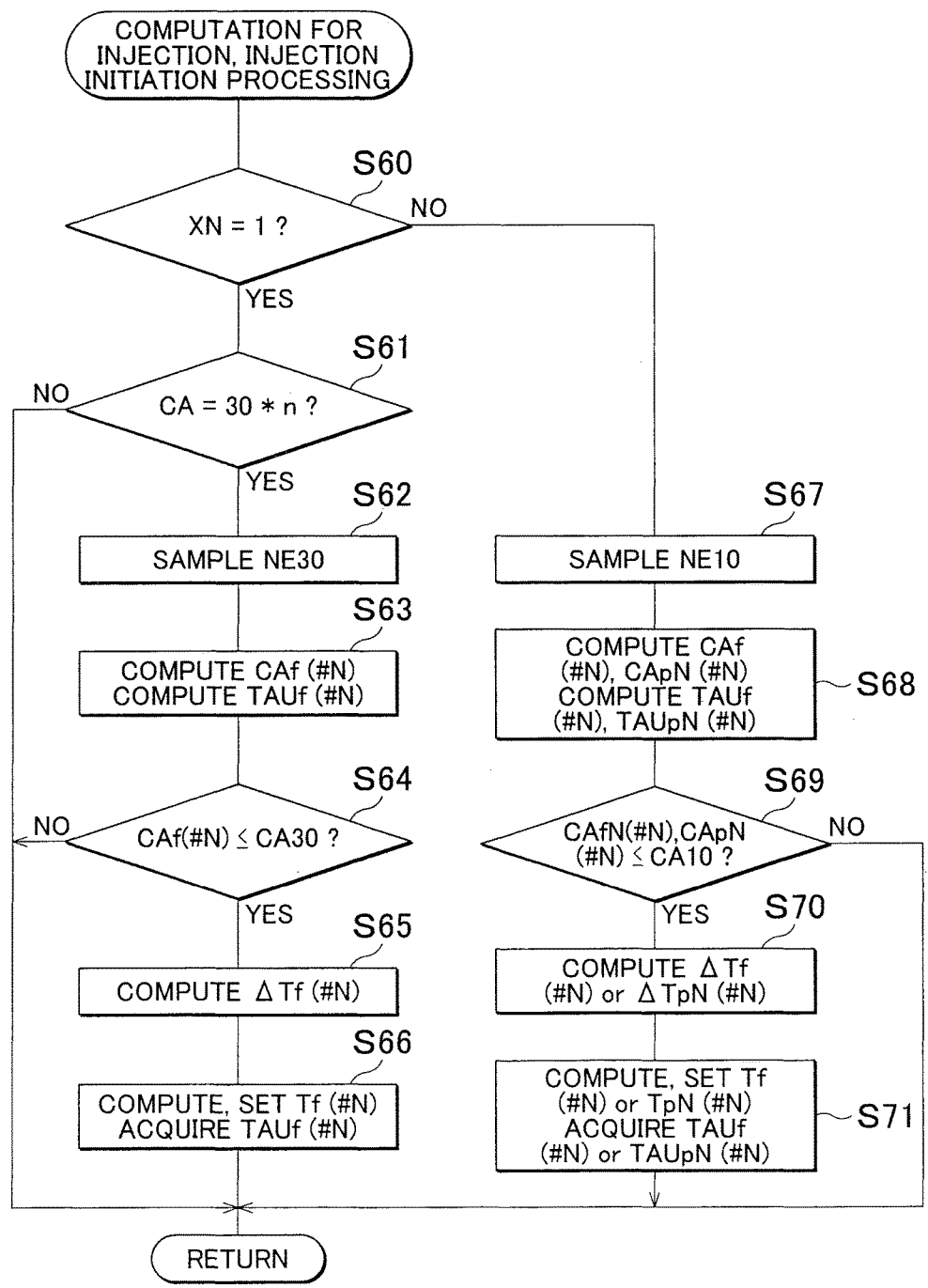
FIG. 15 shows a flow of executing the computation for injection and the injection initiation processing in accordance with the second embodiment.

Next, a further specific description will be made on the computation for injection and the injection initiation processing according to the second embodiment by using the flows in FIG. 15 and FIG. 12. The flow in FIG. 15 is initiated in the interrupt processing at the predetermined crank angle interval (in this example, the crank angle interval of 10°). As described above, the flow in FIG. 12 is initiated in the comparison register interrupt processing when the each fuel injection is initiated.

Once the flow in FIG. 15 is initiated, first, it is determined in step S60 whether the computation interval flag XN is set to 0.1 (XN=1). This flag XN is a flag that is reset in step S53 in FIG. 14 and set in step S57 in FIG. 14. If XN=1 in step S60, the flow proceeds to step S61. On the contrary, if XN=1 is not satisfied, the flow proceeds to step S67.

In step S61, it is determined whether the current crank angle CA is the crank angle 30*n (n is the integer from 1 to 24) (CA=30*n) at the crank angle interval of 30° (the normal crank angle intervals) with the crank angle of 0° being the start point. If CA=30*n, the flow proceeds to step S62. On the contrary, if CA=30*n is not satisfied, the flow is terminated. In other words, steps S62 and onward are performed at the crank angle interval of 30°.

In step S62, the engine speed NE30 is sampled. Next, in step S63, the full injection crank angle CAf (#N) in the each cylinder is computed on the basis of the latest engine speed (the engine speed that is sampled in step S62) NE30 and the latest engine load KL. In addition, the full injection time period TAUf (#N) is computed on the basis of the latest engine speed (the engine speed that is sampled in step S62) NE30, the latest engine, load KL, the latest fuel pressure Pf, and the latest in-cylinder pressure Pc.

Next, it is determined in step S64 whether any of the computed full injection crank angles CAf (#N) is the crank angle (CAf (#N) s CA30) before the crank angle CA30 at which the current crank angle is advanced by 30°. If none of the angles CAf (#N) is the crank angle before the angle CA30, the flow is terminated. On the contrary, if any of the angles CAf (#N) is the crank angle before the angle CA30, the flow proceeds to step S65. Hereinafter, the full injection crank angle that is determined to be the crank angle before the angle CA30 is referred to as the subject full injection crank angle, the full injection that should be initiated at the subject full injection crank angle is referred to as the subject full injection, and the cylinder in which the subject full injection should be initiated is referred to as the subject cylinder.

In step S65, on the basis of the latest engine speed NE30, the time period (the required time period until the initiation of the subject full injection) ΔTf (#N) that is required for the crank angle to become the subject full injection crank angle CAf (#N) from current time Tnow is computed.

Then, in step S66, the time (the initiation time of the subject full injection) Tf (#N) for which the required time period ΔTf (#N) is added to the current time Tnow is computed (Tf (#N)=Tnow+ΔTf (#N)). This time Tf (#N) is set in the register 87 that corresponds to the injection valve 17 of the subject cylinder. Furthermore, the injection initiation flag of the register 87 is set. Moreover, the latest full injection time period that corresponds to the subject full injection (that is, the full injection time period that is computed in step S63) TAUf (#N) is acquired. This TAUf (#N) is stored in the memory, and the flow is terminated. In this way, when the time indicated by the timer 85 matches the initiation time of the subject full injection Tf (#N) that is set in the register 87, the energization of the injection valve 17 in the subject cylinder is executed by the register 87. Then, the full injection is initiated in the subject cylinder.

Then, when the full injection is initiated, the flow in FIG. 12 is initiated in the comparison register interrupt processing. In step S45, the time (the subject termination time of the full injection) Te (#N) for which the full injection time period TAUf (#N), which is stored in the memory in step S66 in FIG. 15, is added to the initiation time of the subject full injection Tf (#N) is computed (Te (#N)=Tf (#N)+TAUf (#N). This time Te (#N) is set in the register 87 that corresponds to the injection valve 17 of the subject cylinder. Furthermore, the injection termination flag of the register 87 is set, and the flow is terminated. Then, when the time indicated by the timer 85 matches the subject termination time of the full injection Te (#N) that is set in the register 87, the energization of the injection valve 17 is stopped by the register 87. In this way, the full injection in the subject cylinder is terminated.

In step S67, the engine speed NE10 is sampled. Next, in step S68, the full injection crank angle CAf (#N) and the first to third partial injection crank angles CApN (#N) in the each cylinder are computed on the basis of the latest engine speed (the engine speed that is sampled in step S67) NE10 and the latest engine load KL. In addition, the full injection time period TAUf (#N) and the first to third partial injection time periods TAUpN (#N) in the each cylinder are computed on the basis of the latest engine speed (the engine speed that is sampled in step S67) NE10, the latest engine load KL, the latest fuel pressure Pf, and the latest in-cylinder pressure Pc.

Next, in step S69, it is determined whether, any of the computed full injection crank angles CAf (#N) and the first to third partial injection crank angles CApN (#N) is a crank angle (CAf (#N)≤CA10) before the crank angle CA10 at which the current crank angle is advanced by 10°. If none of the angles CAf (#N) and CApN (#N) is the crank angle before the angle CA10, the flow is terminated. On the contrary, if any of the angles CAf (#N) and CApN (#N) is the crank angle before the angle CA10, the flow proceeds to step S70. Hereinafter, the injection crank angle that is determined to be the crank angle before the angle CA10 is referred to as the subject injection crank angle, the fuel injection that should be initiated at the subject injection crank angle is referred to as the subject injection, and the cylinder in which the subject injection should be initiated is referred to as the subject cylinder.

In step S70, a time period (a required time period until initiation of the subject injection) ΔTf (#N) or ΔTpN (#N) that is required for the crank angle to become the subject injection crank angle CAf (#N) or CApN (#N) from the current time Tnow is computed on the basis of the latest engine speed NE10.

Next, in step S71, the time (the initiation time of the subject injection) Tf (#N) or TpN (#N) for which the required time period ΔTf (#N) or ΔTpN (#N) is added to the current time Tnow is computed (Tf (#N)=Tnow+ΔTf (#N), TpN (#N)=Tnow+ΔTpN (#N)). This time Tf (#N) or TpN (#N) is set in the register 87 that corresponds to the injection valve 17 of the subject cylinder. Furthermore, the injection initiation flag of the register 87 is set. Moreover, the latest full injection time period TAUf (N) or the partial injection time period TAUpN (#N) that corresponds to the subject injection (the full injection time period or the partial injection time period that is computed in step S68) is acquired. This TAUf (#N) or TAUpN (#N) is stored in the memory, and the flow is terminated. In this way, when the time indicated by the timer 85 matches the initiation time Tf (#N) or TpN (#N) of the subject injection that is set in the register 87, the energization of the injection valve 17 in the subject cylinder is executed by the register 87, and the fuel injection is initiated in the subject cylinder.

Then, when the fuel injection is initiated, the flow in FIG. 12 is initiated in the comparison register interrupt processing. In step S45, the time (the termination time of the subject injection) Te (#N) for which the full injection time period TAUf (#N) or the partial injection time period TAUpN (#N), which is stored in the memory in step S71 in FIG. 15, is added to the initiation time of the subject injection Tf (#N) or TpN (#N) is computed (Te (#N)=Tf (#N)+TAUf (#N), (Te (#N)=TpN (#N)+TAUpN (#N)). This time Te (#N) is set in the register 87 that corresponds to the injection valve 17 of the subject cylinder. Furthermore, the injection termination flag of the register 87 is set, and the flow is terminated. Then, when the time indicated by the timer 85 matches the termination time of the subject injection Te (#N) that is set in the register 87, the energization of the injection valve 17 is stopped by the register 87. In this way, the injection in the subject cylinder is terminated.

Noted that, in the example of FIG. 14, only the single/multi-injection control mode or the single-injection control mode is set in accordance with whether the cold start condition is satisfied and whether the rapid catalyst warming condition is satisfied. However, the multi-injection control mode, in which only the multi-injection control is executed in one engine cycle, may be set when a predetermined condition other than the cold start condition and the rapid catalyst warming condition is satisfied. In this case, the injection control flag XN in FIG. 15 is reset (XN←0). Furthermore, in this case, it is determined in step S60 of FIG. 15 that XN=1 is not satisfied, and the processes in step S67 to step S71 are executed. However, these processes are only performed for the each partial injection in the multi-injection control.

Fuel Pressure Control in the First and Second Embodiments

Figure 16:
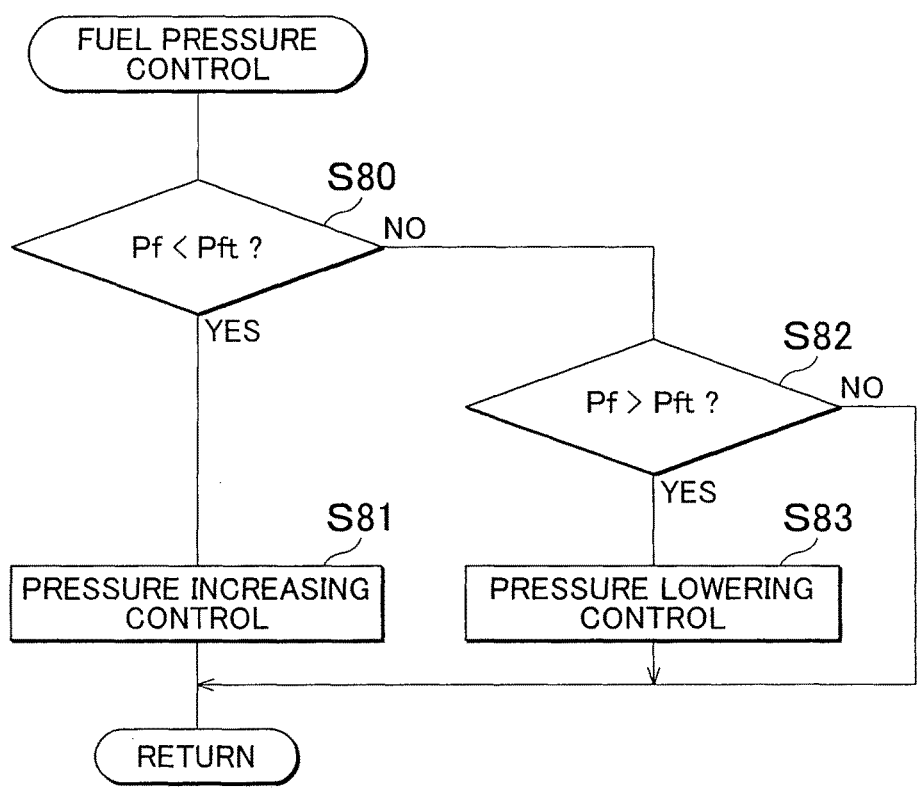
FIG. 16 shows a flow of controlling the fuel pressure in accordance with the embodiments of the present invention.

In the above embodiments, the actuation of the fuel pump 19 is controlled such that the fuel pressure is maintained at predetermined pressure. Next, a further specific description will be made on the control of the fuel pressure according to the above embodiments by using the flow in FIG. 16. The flow in FIG. 16 is initiated in the interrupt processing at the predetermined time intervals. Once the flow in FIG. 16 is initiated, first, it is determined in step S80 whether the fuel pressure Pf is lower than target fuel pressure Pft (Pf<Pft). If Pf<Pft, pressure increase control in which the actuation of the fuel pump 19 is altered so as to increase the fuel pressure is executed in step S81, and the flow is terminated. On the contrary, if Pf<Pft is not satisfied, it is determined in step S82 whether the fuel pressure Pf is higher than the target fuel pressure Pft (Pf>Pft). If Pf>Pft, pressure lowering control in which the actuation of the fuel pump 19 is altered so as to lower the fuel pressure is executed in step S83, and the flow is terminated. On the contrary, if Pf>Pft is not satisfied, the fuel pressure is equal to the target fuel pressure. Thus, the flow is terminated as is.

Modified Examples

In a modified example of the first embodiment, when a condition other than the cold start condition and the rapid catalyst warming condition is satisfied, the multi-injection control may be executed. In a modified example of the second embodiment, when the condition other than the cold start condition and the rapid catalyst warming condition is satisfied, both of the single-injection control and the multi-injection control may be executed.

In the modified example of each of the above embodiments, the number of the partial injections in the multi-injection control may be changed in accordance with the engine state.

The engine load, the fuel pressure, and the in-cylinder pressure (hereinafter also referred to as "the engine load and the like") may be sampled at the predetermined crank angle intervals. The engine speed may be sampled at the predetermined time intervals. The computation for injection may be executed at the predetermined time intervals. The additional computation for injection may be executed at the time of the predetermined time interval. The injection initiation processing may be executed at the time of the predetermined time interval.

The shortened time interval and the normal time interval are respectively not limited to 0.39 ms and 1.2 ms. These time period intervals may be any time period intervals as long as the shortened time interval is a shorter time interval than the normal time interval. In addition, each of the time period intervals may not be a constant time period interval but an arbitrary time period interval as long as the shortened time interval is shorter than the normal time interval.

When the AD conversion schedule (the schedule to determine an order of the AD conversion for the parameters each time a constant time period Δtad elapses) is changed, the time period intervals for sampling the engine load and the like are consequently changed. Thus, in the above embodiments, the time period intervals for sampling the engine load and the like may be changed by changing the AD conversion schedule.

More specifically, for example, it is assumed that the parameter values that are required to compute the control values on the full injection and are subject to the AD conversion are A, B, and C, the other parameter values that are subject to the AD conversion are Y and Z, and the AD conversion schedule for sampling each of the parameter values at the time when the predetermined time interval is the normal time interval is in an order of A, Y, Z, B, Y, Z, C, Y, and Z. In this AD conversion schedule, each of the parameter values A, B, and C is subject to the AD conversion at every time 9*Δtad. In other words, the normal time interval is 9*Δtad. On the contrary, in the case where each of the parameter values are sampled when the predetermined time interval is the shortened time interval, the AD conversion schedule is changed to be in an order of A, Y, B, Z, C, and Y. In this AD conversion schedule, each of the parameter values A, B, and C is subject to the AD conversion at every time 6*Δtad. In other words, the shortened time interval is 6*Δtad, and the predetermined time interval is shorter than the normal time interval 9*Δtad.

The shortened crank angle interval and the normal crank angle interval are respectively not limited to the crank angle interval of 10° and the crank angle interval of 30°. These crank angle intervals may be any of the crank angle intervals as long as the shortened crank angle interval is the shorter interval than the normal crank angle interval. In addition, each of the crank angle intervals may not be the constant crank angle interval but may be the arbitrary crank angle interval as long as the shortened crank angle interval is the shorter interval than the normal crank angle interval.

In the case where the multi-injection control is executed in the first embodiment, and in the case where both of the single-injection control and the multi-injection control are executed in the second embodiment, only one or some of the predetermined crank angle interval for executing the computation for injection, the predetermined crank angle for defining the crank angle at which the additional computation for injection is executed, the predetermined crank angle for defining the crank angle at which the injection initiation processing is executed, the predetermined crank angle interval for sampling the engine speed, and the predetermined time interval for sampling the engine load and the like may be shortened.

The parameter values other than the engine speed, the engine load, the fuel pressure, and the in-cylinder pressure may be used to compute the injection crank angle, the fuel injection time period, and the required time period until the initiation of injection. As the control values for controlling the fuel injection, the control values other than the injection crank angle, the fuel injection time period, and the required time period until the initiation of injection may be computed.

The required time period until the initiation of the each fuel injection may be computed by using the normal crank angle interval or the shortened crank angle interval. In addition, the control values that are computed at the normal crank angle interval or the shortened crank angle interval may be only one of the combination of the full injection crank angle and the partial injection crank angle or the combination of the full injection time period and the partial injection time period. In this case, the control value that is not computed is computed only at the crank angle at which the injection initiation processing is executed. Alternatively, both of the combination of the full injection crank angle and the partial injection crank angle and the combination of the full injection time period and the partial injection time period may be computed only at the crank angle at which the injection initiation processing is executed.

In each of the above embodiments is an embodiment in which the fuel injection control of the present invention is applied as the fuel injection control in all of the four cylinders. However, the present invention may only be applied to the fuel injection control in one of the cylinders.

In the multi-injection control of each of the above embodiments, the partial injection is executed for plural times. However, the present invention can also be applied to a case where the full injection is executed for plural times in the multi-injection control. Furthermore, the full injection is executed only once in the single-injection control in each of the above embodiments. However, the present invention can also be applied to a case where the partial injection is executed only once in the single-injection control.

In each of the above embodiments, in the case where both of the single-injection control and the multi-injection control are executed in one engine cycle, the single-injection control is executed in the middle stage of the intake stroke, and the multi-injection control is executed in the late stage of the compression stroke. However, the present invention can be applied to a case where the single-injection control is executed at timing other than the middle stage of the intake stroke, and can also be applied to a case where the multi-injection control is executed at timing other than the late stage of the compression stroke.

In each of the above embodiments, when the multi-injection control is executed in one engine cycle, the single-injection control is always executed. The present invention can be applied to a case where only the multi-injection control is executed in one engine cycle.

As it is understood from the above description, the present invention is applied to the internal combustion engine 10 that includes the fuel injection valve 17, and also relates to the fuel injection control device. The fuel injection control device has the control section (the ECU 80) that: samples the parameter values on the operation state of the engine (the engine speed NE, the engine load KL, the fuel pressure Pf, the in-cylinder pressure Pc, and the like) at the predetermined sampling intervals; repeatedly computes the control values on fuel injection from the fuel injection valve (the injection crank angle CAf and/or CAp1 to CAp3, the fuel injection time period TAUf and/or TAUp1 to TAUp3, the required time period until the initiation of injection ΔTf and/or ΔTp1 to ΔTp3, and the like) at the predetermined intervals on the basis of the latest values among the sampled parameter values; and controls the fuel injection on the basis of the computed control values.

The control section is configured to execute processing for initiating the each fuel injection in either one of the first processing mode (the normal processing mode) and the second processing mode (the shortened processing mode). In the first processing mode, the processing for initiating the each fuel injection (the injection initiation processing) is executed on the basis of the latest usable control values at the crank angle immediately before the initiation of the each fuel injection among the crank angles at the first crank angle intervals (for example, the crank angle intervals of 30°). In the second processing mode, the processing for initiating the each fuel injection (the injection initiation processing) is executed on the basis of the latest usable control values at the crank angle immediately before the each fuel injection among the crank angles at the second crank angle intervals (for example, the crank angle intervals of 10°), the second crank angle interval being shorter than the first crank angle interval.

The control section is configured to execute the processing for initiating the fuel injection of the single-injection control (the setting of the initiation time of the full injection Tf and the acquisition of the full injection time period TAUf) in the first processing mode (step S29 in FIG. 11B and step S66 in FIG. 15) when executing the single-injection control, in which the fuel injection (the full injection) is initiated only once within the time period corresponding to the first crank angle interval.

Meanwhile, the control section is also configured to execute the processing for initiating the each fuel injection of the multi-injection control (the setting of the initiation times of the partial injection Tp1 to Tp3 and the acquisition of the partial injection time periods TAUp1 to TAUp3) in the second processing mode (step S40 in FIG. 11B and step S71 in FIG. 15) when executing the multi-injection control, in which the fuel injection (the partial injection) is initiated for plural times within the time period corresponding to the first crank angle interval.

Furthermore, the control section is configured to compute the control values in either one of the first computing mode (the normal computing mode) and the second computing mode (the shortened computing mode). In the first computing mode, the control values are computed (step S28 in FIG. 11B and step S65 in FIG. 15) at least at the crank angle immediately before the initiation of the each fuel injection among the crank angles at the first crank angle intervals. In the second computing mode, the control values are computed (step S39 in FIG. 11B and step S70 in FIG. 15) at least at the crank angle immediately before the initiation of the each fuel injection among the crank angles at the second crank angle intervals.

In this case, the control section is configured to compute the control value (the required time period until the initiation of full injection ΔTf) in the first computing mode when executing the single-injection control. The control section is also configured to compute the control values (the required time periods until the initiation of partial injection ΔTp1 to ΔTp3) in the second computing mode when executing the multi-injection control.

Moreover, the control section is configured to compute the control values in either one of the first computing mode (the normal computing mode) and the second computing mode (the shortened computing mode). In the first computing mode, the control values are computed at the first crank angle intervals. In the second computing mode, the control values are computed at the second crank angle intervals.

In this case, the control section is configured to compute the control values (the full injection crank angle CAf and the full injection time period TAUf) in the first computing mode when executing the single-injection control. The control section is also configured to compute the control values (the partial injection crank angles CAp1 to CAp3 and the partial injection time periods TAUp1 to TAUp3) in the second computing mode when executing the multi-injection control.

The invention claimed is:

1. A fuel injection control device for an internal combustion engine provided with a fuel injection valve, the fuel injection control device comprising:
an electronic control unit configured to
a) sample parameter values on an operation state of the internal combustion engine at predetermined sampling intervals,
b) repeatedly compute a control value for controlling fuel injection from the fuel injection valve at predetermined computing intervals based on a latest value among the sample parameter values,
c) control the fuel injection based on the control value,
d) execute processing to initiate the fuel injection in one or more of a first processing mode and a second processing mode, the first processing mode being a mode in which the fuel injection is initiated based on a latest usable control value at a crank angle before initiation of the fuel injection selected from among crank angles spaced at first crank angle intervals, the second processing mode being a mode in which the fuel injection is initiated based on a latest usable control value at a crank angle before the fuel injection selected from among crank angles spaced at second crank angle intervals, and the second crank angle intervals each being shorter than the first crank angle intervals, and at least one of:
e) execute processing to initiate the fuel injection of single-injection control in the first processing mode, the single-injection control being control in which the fuel injection is initiated only once within a time period corresponding to the first crank angle interval, and
f) execute processing to initiate the fuel injection of multi-injection control in the second processing mode, the multi-injection control being control in which the fuel injection is initiated more than once within the time period corresponding to the first crank angle interval.

2. The fuel injection control device according to claim 1 wherein
the internal combustion engine is a multi-cylinder internal combustion engine, and
the electronic control unit is configured to execute processing to initiate the fuel injection of the single-injection control and the multi-injection control in the second processing mode when executing the single-injection control and the multi-injection control in one engine cycle of each cylinder.

3. The fuel injection control device according to claim 1 wherein
the electronic control unit is configured to compute the control value in either one of a first computing mode and a second computing mode, the first computing mode being a mode in which the control value is computed at least at the crank angle before the fuel injection selected from among the crank angles spaced at the first crank angle intervals, and the second computing mode being a mode in which the control value is computed at least at the crank angle before the fuel injection selected from among the crank angles spaced at the second crank angle intervals,
the electronic control unit is configured to compute the control value in the first computing mode when executing the single-injection control, and
the electronic control unit is configured to compute the control value in the second computing mode when executing the multi-injection control.

4. The fuel injection control device according to claim 1 wherein
the electronic control unit is configured to compute the control value in either one of a first computing mode and a second computing mode, the first computing mode being a mode in which the control value is computed at the first crank angle intervals, and the second computing mode being a mode in which the control value is computed at the second crank angle intervals,
the electronic control unit is configured to compute the control value in the first computing mode when executing the single-injection control, and
the electronic control unit is configured to compute the control value in the second computing mode when executing the multi-injection control.

5. The fuel injection control device according to claim 3 wherein
the internal combustion engine is a multi-cylinder internal combustion engine, and
the electronic control unit is configured to compute the control value in the second computing mode and execute processing to initiate the fuel injection of the single-injection control and the multi-injection control in the second processing mode when executing the single-injection control and the multi-injection control in one engine cycle of each cylinder.

6. The fuel injection control device according to claim 1 wherein the electronic control unit is configured to sample the parameter value in either one of a first sampling mode and a second sampling mode, the first sampling mode being a mode in which the parameter value is sampled at first sampling intervals, the second sampling mode being a mode in which the parameter value is sampled at second sampling intervals, the second sampling interval being shorter than the first sampling interval, the electronic control unit is configured to sample the parameter value in the first sampling mode when executing the single-injection control, and the electronic control unit is configured to sample the parameter value in the second sampling mode when executing the multi-injection control.

7. The fuel injection control device according to claim 6 wherein the first sampling interval is a constant first time interval, and the second sampling interval is a constant second time interval that is shorter than the first time interval.

8. The fuel injection control device according to claim 6 wherein the first sampling interval is the first crank angle interval, and the second sampling interval is the second crank angle interval.

9. The fuel injection control device according to claim 8 wherein the electronic control unit is configured to sample an engine speed that is one of the parameter values in the first sampling mode when executing the single-injection control, and the electronic control unit is configured to sample the engine speed in the second sampling mode when executing the multi-injection control.

10. The fuel injection control device according to claim 6 wherein the internal combustion engine is a multi-cylinder internal combustion engine, and when executing the single-injection control and the multi-injection control in one engine cycle of each cylinder, the electronic control unit is configured to i) sample the parameter value in the second sampling mode, ii) compute the control value in the second computing mode, and iii) execute processing to initiate the fuel injection of the single-injection control and the multi-injection control in the second processing mode.

11. The fuel injection control device according to claim 1 wherein the fuel injection of the multi-injection control is partial injection in which a needle valve is closed before an needle lift amount of the fuel injection valve reaches a maximum lift amount.

12. The fuel injection control device according to claim 1 wherein the fuel injection of the single-injection control is full injection in which the needle valve is closed after the needle lift amount of the fuel injection valve reaches the maximum lift amount.

* * * * *